United States Patent
Wada et al.

(10) Patent No.: US 9,260,992 B2
(45) Date of Patent: Feb. 16, 2016

(54) OIL MIST SEPARATOR

(75) Inventors: Masaya Wada, Yokohama (JP); Kosaku Ishida, Yokohama (JP); Kazuki Shirakura, Yokohama (JP); Yuta Endo, Yokohama (JP); Yoshitaka Nakamura, Yokohama (JP); Kazuo Tanaka, Yokohama (JP); Takatsugu Kurosawa, Yokohama (JP); Jun Takashima, Yokohama (JP)

(73) Assignee: Tokyo Roki Co., Ltd., Yokohama-shi (JP)

( * ) Notice: Subject to any disclaimer, the term of this patent is extended or adjusted under 35 U.S.C. 154(b) by 553 days.

(21) Appl. No.: 13/806,619

(22) PCT Filed: Jun. 24, 2010

(86) PCT No.: PCT/JP2010/060756
§ 371 (c)(1),
(2), (4) Date: Mar. 4, 2013

(87) PCT Pub. No.: WO2011/161796
PCT Pub. Date: Dec. 29, 2011

(65) Prior Publication Data
US 2013/0205726 A1    Aug. 15, 2013

(51) Int. Cl.
*F01M 13/04* (2006.01)
*B01D 46/00* (2006.01)
(Continued)

(52) U.S. Cl.
CPC ............ *F01M 13/04* (2013.01); *B01D 46/003* (2013.01); *B01D 46/0043* (2013.01);
(Continued)

(58) Field of Classification Search
CPC ............... B01D 45/08; B01D 46/0043; B01D 46/2411; B01D 2265/06; F01M 13/04; F01M 2013/0427; F01M 2013/0461; F01M 2013/0488; F01M 2013/0438; F01M 2013/0072
See application file for complete search history.

(56) References Cited

U.S. PATENT DOCUMENTS 1,496,926 A * 6/1924 England ................. B01D 45/08
                                                    55/419
4,387,603 A * 6/1983 Nelson ................... B01D 45/08
                                                    73/863.22
(Continued)

FOREIGN PATENT DOCUMENTS

CN    101257958 A    9/2008
DE    2828256 A1    1/1980
(Continued)

OTHER PUBLICATIONS

Office Action, European Patent Application No. 10853656.6, Aug. 25, 2014.
(Continued)

*Primary Examiner* — Duane Smith
*Assistant Examiner* — Stephen Hobson
(74) *Attorney, Agent, or Firm* — Harness, Dickey & Pierce, P.L.C.

(57) ABSTRACT

[Problem to be Solved]
To enhance the performance for separation of oil mist from blow-by gas.
[Solution]
A filter element 13 which is to be attached to an oil separator unit 3 includes a core 31. This core is a double tube having an internal cylindrical member 34 and an external cylindrical member 35, and a space between the internal cylindrical member and the external cylindrical member is used as a separation chamber 36. An injection hole 39 for injecting blow-by gas while increasing its flow velocity is provided in the internal cylindrical member. A surface which is an inner wall surface of the external cylindrical member and which faces the injection hole is a spraying surface onto which the blow-by gas injected from the injection hole is sprayed. Moreover, an opening for oil discharge from which oil OL condensed on the spraying surface is discharged, and an opening for discharge from which the blow-by gas from which oil mist has been separated is discharged are provided in the core.

14 Claims, 23 Drawing Sheets

(51) Int. Cl.
 *B01D 46/24* (2006.01)
 *F01M 13/00* (2006.01)

(52) U.S. Cl.
 CPC ....... *B01D 46/2411* (2013.01); *B01D 2265/06* (2013.01); *F01M 2013/0072* (2013.01); *F01M 2013/0427* (2013.01); *F01M 2013/0438* (2013.01); *F01M 2013/0488* (2013.01)

(56) References Cited

U.S. PATENT DOCUMENTS

| 7,655,073 | B2 | 2/2010 | Evenstad | |
|---|---|---|---|---|
| 2005/0150828 | A1* | 7/2005 | Vandrak | B01D 45/08 210/513 |
| 2006/0075998 | A1 | 4/2006 | Shieh et al. | |
| 2008/0264018 | A1* | 10/2008 | Herman | 55/462 |
| 2010/0024366 | A1* | 2/2010 | Hodges et al. | 55/320 |
| 2010/0229510 | A1* | 9/2010 | Heinen | B01D 45/08 55/322 |

FOREIGN PATENT DOCUMENTS

| EP | 1068890 | A1 | 1/2001 | |
|---|---|---|---|---|
| FR | 2921101 | A1 | 3/2009 | |
| JP | 41-8541 | | 4/1966 | |
| JP | 49-11094 | | 3/1974 | |
| JP | 57-171410 | | 10/1982 | |
| JP | 61-167422 | | 7/1986 | |
| JP | 2-127723 | | 10/1990 | |
| JP | 2001-054711 | | 2/2001 | |
| JP | 2005-248926 | | 9/2005 | |
| JP | 2009-539013 | | 11/2009 | |
| WO | 2007/129137 | A1 | 11/2007 | |
| WO | WO 2007138008 | A2 * | 12/2007 | ............ F01M 13/04 |

OTHER PUBLICATIONS

Office Action, Chinese Patent Application No. 201080067652.7, Dec. 17, 2014.
Notification of Reasons for Rejection, Japanese Patent Application No. 2012-521229, Mar. 18, 2014.

* cited by examiner

OIL MIST SEPARATOR

CROSS-REFERENCE TO RELATED APPLICATIONS

This is a U.S. National Stage Application of International Application No. PCT/JP2010/060756, filed on Jun. 24, 2010 and published in Japanese as WO 2011/161796 on Dec. 29, 2011. The disclosure of the above application is incorporated herein by reference.

TECHNICAL FIELD

The present invention relates to a separator for separating oil mist from oil-containing gas containing oil mist.

BACKGROUND ART

With an engine of a vehicle and the like, blow-by gas is emitted from a combustion chamber toward the inside of a crankcase through a gap between a piston and a cylinder. This blow-by gas is an unburned mixture, and is thus returned to the engine. However, this blow-by gas also contains oil mist. Accordingly, at the time of returning the blow-by gas to the engine, the oil mist is separated from the blow-by gas by a ventilator.

For example, a device described in PTL 1 accelerates the flow of blow-by gas by a nozzle, and injects the blow-by gas against a collision wall opposite the nozzle. This collision wall is covered with a textile or non-woven cloth, and is structured to absorb the oil mist.

CITATION LIST

Patent Literature

[Patent Literature 1] Japanese translation of PCT International application No. 2009-539013

SUMMARY OF INVENTION

Technical Problem

With the device of PTL 1, when the textile or the like covering the collision wall absorbs plenty of oil, the oil absorbability is reduced. Thus, there is a problem that when the textile or the like absorbs a large amount of oil, the performance for separation of oil mist from blow-by gas is reduced.

The present invention has been made in view of the above, and its object is to enhance the performance for separation of oil mist from blow-by gas.

Solution to Problem

To achieve the object described above, the present invention is a separator that separates oil mist from oil-containing gas containing the oil mist, the separator including a separation chamber including an injection hole configured to inject the oil-containing gas while increasing a flow velocity thereof compared with a flow velocity in a gas channel through which the oil-containing gas has flowed, and a spraying surface, facing the injection hole, onto which the oil-containing gas injected from the injection hole is sprayed, an oil discharge portion, communicating with the separation chamber, configured to discharge oil condensed on the spraying surface, and a gas discharge portion, communicating with the separation chamber, configured to discharge gas after the oil mist that is condensed is separated.

Advantageous Effects of Invention

According to the present invention, the performance for separation of oil mist from blow-by gas can be enhanced.

BRIEF DESCRIPTION OF DRAWINGS

FIG. 16($b$) is a conceptual view schematically showing separation of oil.
FIG. 16($c$) is a conceptual view schematically showing an oil mist.

DESCRIPTION OF EMBODIMENTS

An embodiment of the present invention is described below with reference to the drawings. Here, an explanation is given on a closed crankcase ventilation system (hereinafter, referred to as a ventilation system).

Figure 1:
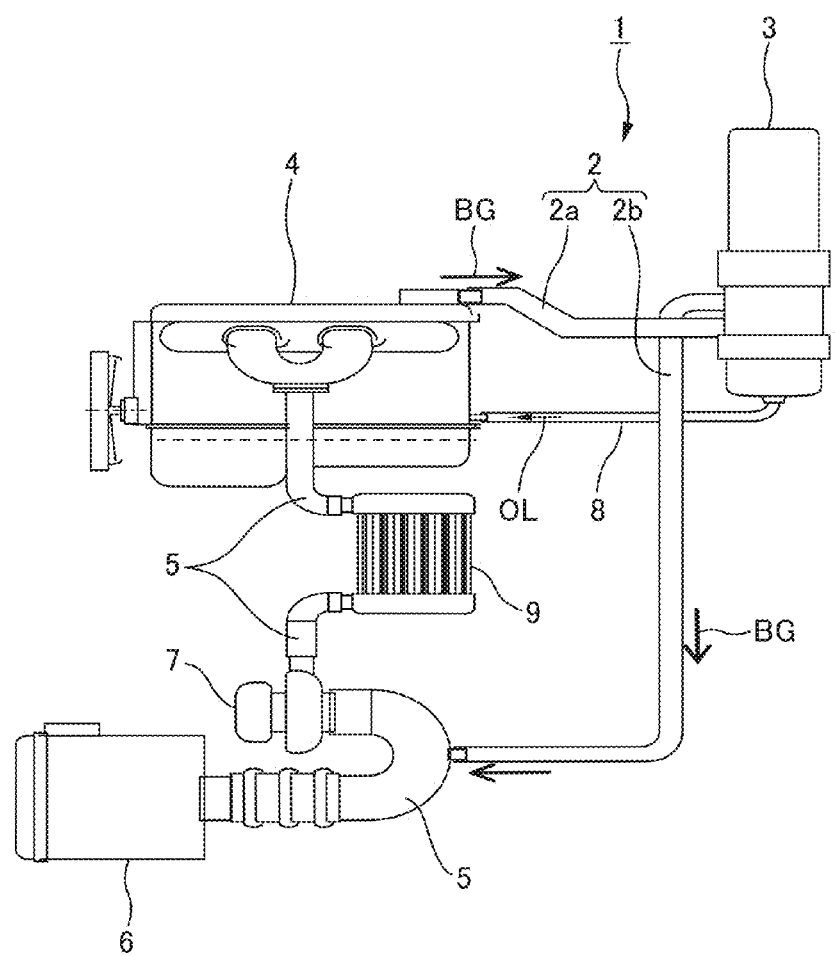
FIG. 1 is a schematic view showing a closed crankcase ventilation system.

As shown in FIG. 1, a ventilation system 1 includes a breather pipe 2 and an oil separator unit 3. The breather pipe 2 partitions a returning channel for returning blow-by gas BG (oil-containing gas) discharged from a crankcase of an engine 4 to an air inlet side channel 5 that is in communication with the engine 4. The breather pipe 2 of the present embodiment returns the blow-by gas BG to a part of the air inlet side channel 5, at a position connecting an air filter 6 and a turbocharger 7. The oil separator unit 3 is provided halfway along the breather pipe 2, and separates and collects oil OL from the blow-by gas BG and returns the oil to the engine 4.

With this ventilation system 1, the blow-by gas GB discharged from the engine 4 flows into the oil separator unit 3 through an upstream side breather pipe 2a. Then, the oil OL separated by the oil separator unit 3 is returned to the engine 4 through an oil collection pipe 8. Also, the blow-by gas BG from which the oil OL has been separated by the oil separator unit 3 is returned to the air inlet side channel 5 through a downstream side breather pipe 2b. The returned blow-by gas BG is mixed with fresh air from the air filter 6, and is compressed by the turbocharger 7. Then, the blow-by gas BG is cooled by a charge cooler 9, and is supplied to the engine 4. Accordingly, the blow-by gas BG from which the oil OL has been removed can be supplied to the engine 4.

Next, the oil separator unit 3 will be described.

Figure 2:
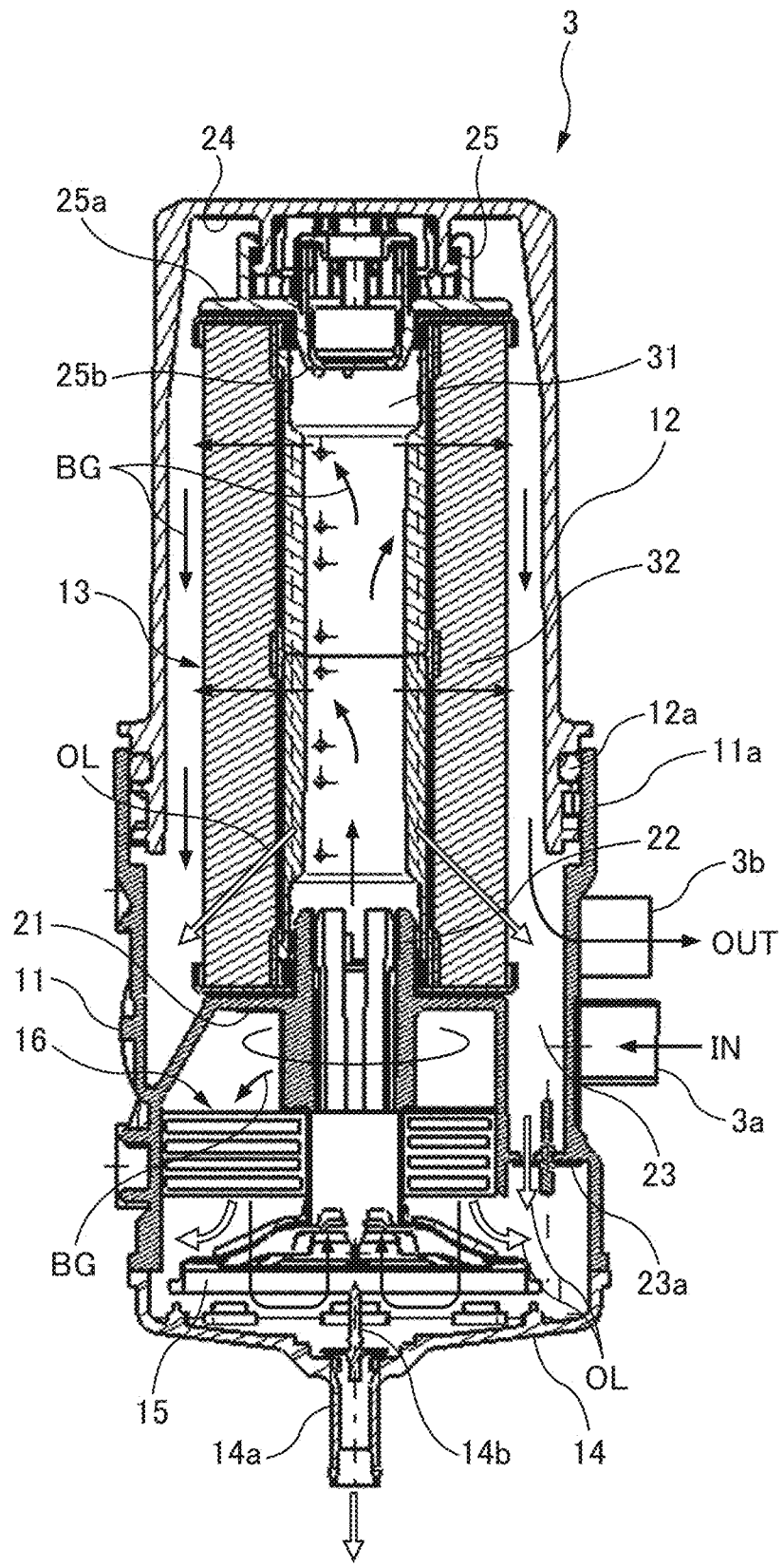
FIG. 2 is a vertical cross-sectional view of a ventilator.

As shown in FIG. 2, the oil separator unit 3 of the present embodiment includes a housing 11, a cap member 12, a filter element 13, a drain member 14, a separation unit holder 15 and a separation unit 16. Among these sections, a core 31 of the filter element 13 and the separation unit 16 each correspond to a separator that separates oil mist from oil-containing gas.

As will be described later, the oil separator unit 3 first separates a part of oil mist from the blow-by gas BG by the separation unit 16. Then, oil mist is further separated by the core 31 from the blow-by gas BG discharged from the separation unit 16. In this manner, the separation unit 16 functions as a separator on the upstream side, and the core 31 functions as a separator on the downstream side. Moreover, the oil separator unit 3 functions as an oil separation unit 16 including the separator on the upstream side and the separator on the downstream side.

The housing 11 is a circular cylindrical member with open top and bottom, and a base 21 on which the filter element 13 is to be placed is provided in the inner space, halfway along the axial direction.

A cylindrical communication portion 22 that communicates an upper space above the base 21 and a lower space below the base 21 is provided in the base 21. The upper portion of the cylindrical communication portion 22 is inserted into the lower end portion of the core 31 of the filter element 13. On the other hand, the separation unit holder 15 is attached to the lower end portion of the cylindrical communication portion 22. Also, the cylindrical communication portion 22 holds the separation unit 16, in addition to the separation unit holder 15.

Furthermore, a part of the base 21 is separated from the inner wall surface of the housing 11, and a drain channel 23 is formed at this separated part. The drain channel 23 communicates the upper space and the lower space, and the oil OL collected by the core 31 flows down the drain channel 23. An intermediate valve 23a is provided at the lower end of the drain channel 23. The intermediate valve 23a is normally closed, and is opened when leading oil in the drain channel 23 to the lower space.

Also, an upper end portion 11a of the housing 11 is provided to slightly bulge from the outer circumferential side compared to other portions. A female screw is provided on the inner circumferential surface of the upper end portion 11a, causing the same to function as an attaching portion for attaching a cap member 12.

The cap member 12 has an opening at the lower end, and is a cylindrical member whose upper end is closed with a ceiling 24. A male screw is provided on, and an O-ring 12a is attached to, the outer circumferential surface of the lower end portion of the cap member 12. Therefore, by screwing the lower end portion of the cap member 12 into the upper end portion 11a of the housing 11, the O-ring 12a fills the gap between the housing 11 and the cap member 12, and an airtight space is formed inside the cap member 12 and the housing 11. This airtight space is used as an element accommodating space for accommodating the filter element 13.

Furthermore, a pressing/holding portion 25 is provided on the inner surface of the ceiling 24. This pressing/holding portion 25 is a part for holding the filter element 13 while pressing the filter element 13 toward the base by a pressing plate 25a. A convex protrusion 25b is provided, facing downward, at the center of the pressing plate 25a. This convex protrusion 25b is fitted into the upper end portion of the core 31 of the filter element 13. The filter element 13 is thereby maintained in a state of being pressed toward the base 21.

Figure 3:
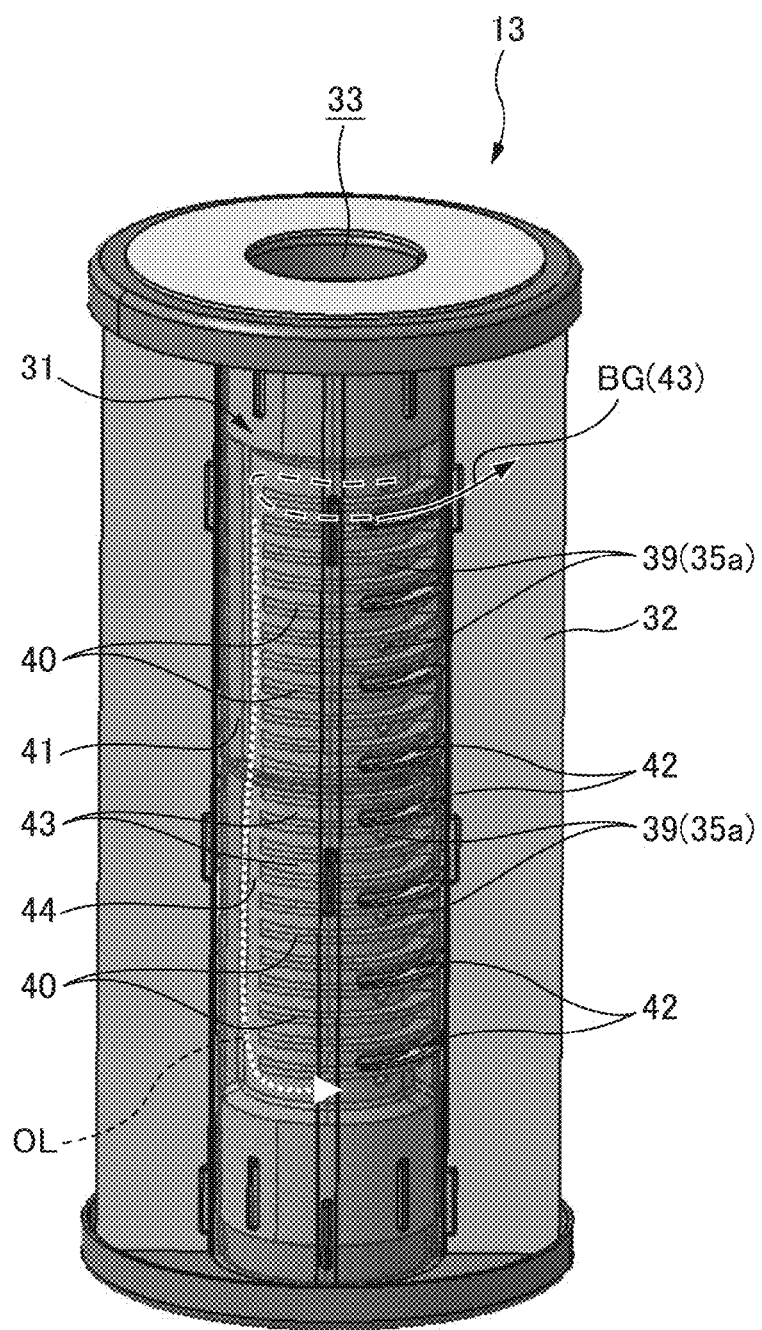
FIG. 3 is a transparent perspective view of a filter element.
Figure 4:
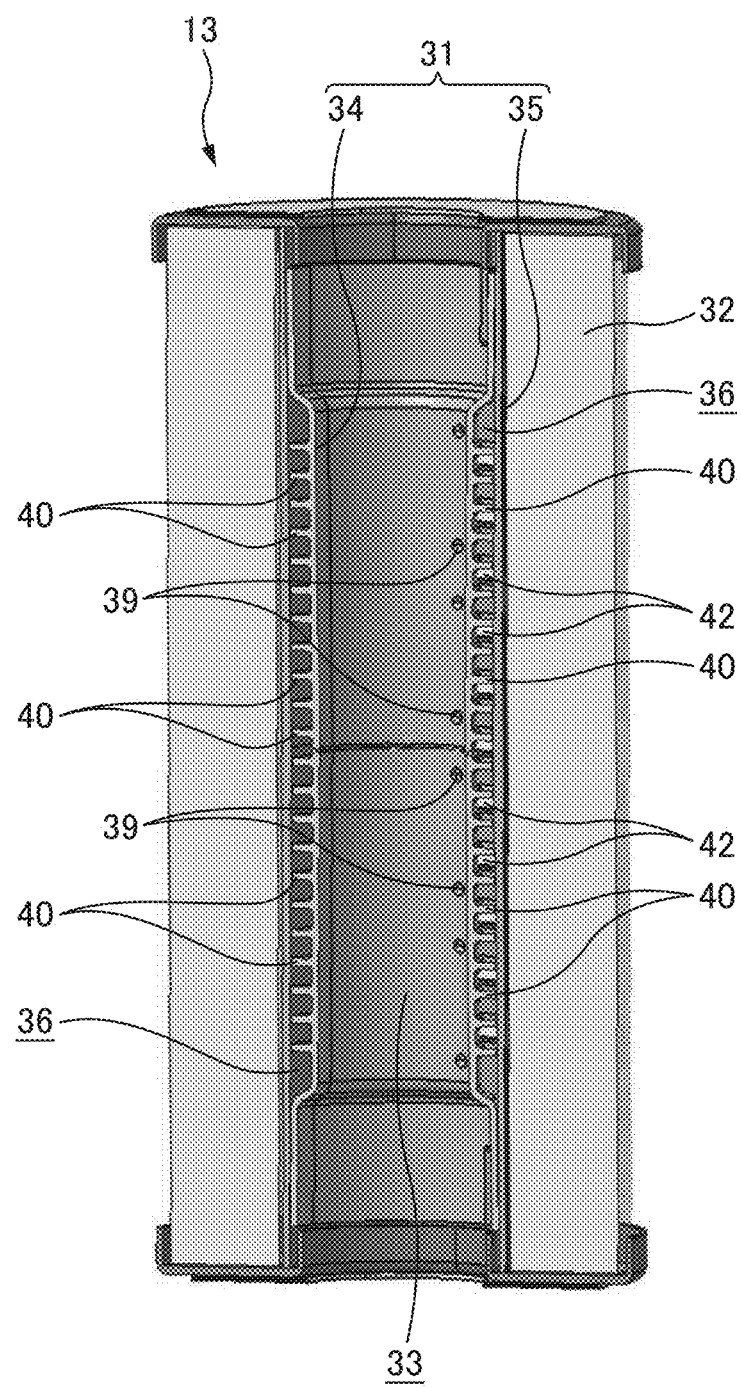
FIG. 4 is a vertical cross-sectional view of the filter element.

As shown in FIGS. 3 and 4, the filter element 13 is in a cylindrical form seen from outside. The cylindrical core 31 is arranged at the center in the diametrical direction. As described above, the core 31 corresponds to a separator, and is formed of a double tube in the present embodiment. Additionally, the core 31 will be described later in detail.

In the filter element 13, the blow-by gas BG from which oil has been separated by the separation unit 16 flows into an inner space 33 (an upstream gas channel) of the core 31. Oil mist is separated from the blow-by gas BG in the process of the blow-by gas BG passing through the core 31.

A filtering member 32 is arranged on the outer circumference of the core 31. The filtering member 32 removes carbon or the like contained in the blow-by gas BG which has passed through the core 31, or guides the oil separated by the core 31. As the filtering member 32, synthetic fibers molded into a cylindrical form are used, for example. Additionally, in addition to a molded synthetic fiber product, a filter paper folded into an accordion shape may also be used as the filtering member 32. The blow-by gas BG which has passed through the filtering member 32 is returned to the air inlet side channel 5 via a discharge port 3b (see FIG. 2) and the downstream side breather pipe 2b (see FIG. 1) connected to the discharge port 3b. Also, as shown in FIG. 2, the separated oil OL which has passed through the filtering member 32 flows down into a space partitioned by the drain member 14.

The drain member 14 is a funnel-shaped member, and is connected to the lower end of the housing 11 from below. That is, the end surface on the wide opening side of the drain member 14 is joined to the lower end surface of the housing 11 in a liquid-tight manner. A unit accommodating space for accommodating the separation unit 16 is thereby partitioned by the housing 11 and the drain member 14. Furthermore, a narrowed portion (a squeezed channel) 14a of the drain member 14 is arranged facing downward, and functions as a discharge channel for discharging the separated oil OL. The oil OL which has been discharged from the narrowed portion 14a is returned to the engine 4 through the oil collection pipe 8, as shown in FIG. 1. A positive crankcase ventilation (PCV) valve 14b is provided in the upper end portion of the narrowed portion 14a. The PCV valve 14b is provided to mitigate the influence of a change in the intake negative pressure of the engine 4. Moreover, when the PCV valve 14b moves upward, the oil OL flows down.

Figure 17:
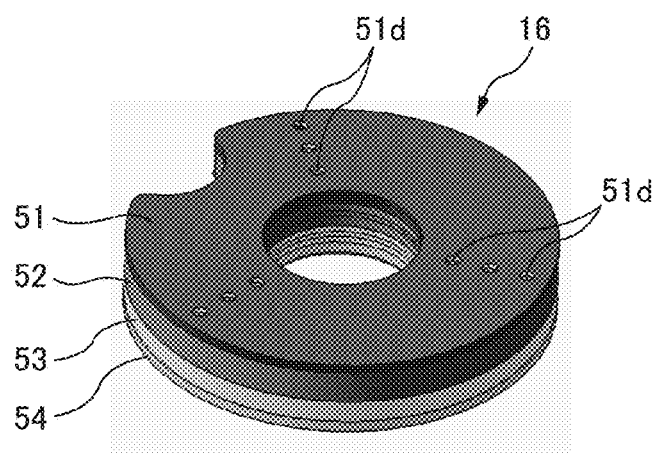
FIG. 17 is a perspective view showing the exterior of a separation unit.

As shown in FIG. 2, the separation unit 16 and the separation unit holder 15 are accommodated in the unit accommodating space partitioned off by the housing 11 and the drain member 14. As described above, the separation unit 16 corresponds to a separator, and is formed as shown in FIG. 17, for example, by overlaying, in a through-thickness direction, a plurality of substantially disk-shaped members, each having a part of the outer circumference cut out in an arc shape and having a round opening at its center. Additionally, the separation unit 16 will be described later in detail.

As shown in FIG. 2, the separation unit holder 15 is a part that, together with the cylindrical communication portion 22, holds the separation unit 16. As shown also in FIG. 19, the separation unit holder 15 of the present embodiment is formed into a trumpet shape, with its lower portion flaring out toward the bottom side. The upper end portion of the separation unit holder 15 is attached to the lower end portion of the cylindrical communication portion 22, and the separation unit 16 is held at a position higher than the hem.

Next, the core 31 will be described in detail.

Figure 5:
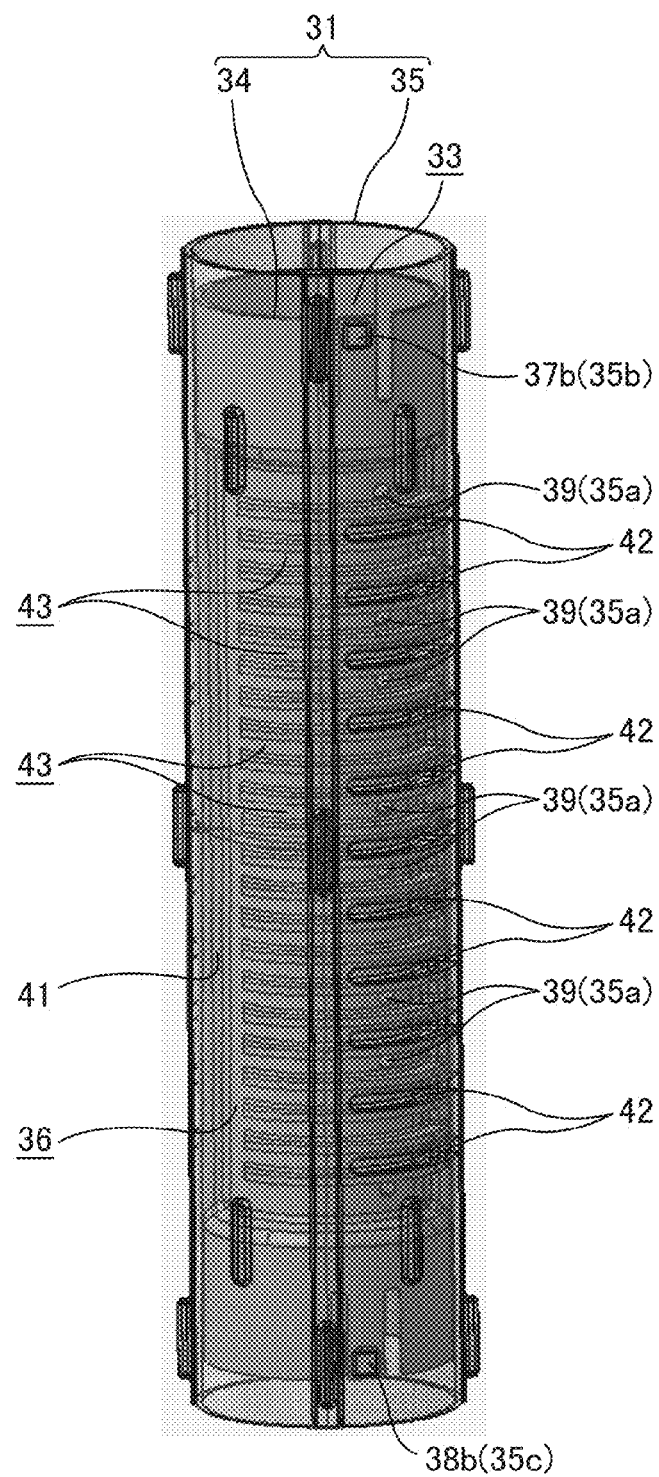
FIG. 5 is a transparent perspective view of a core.
Figure 6:
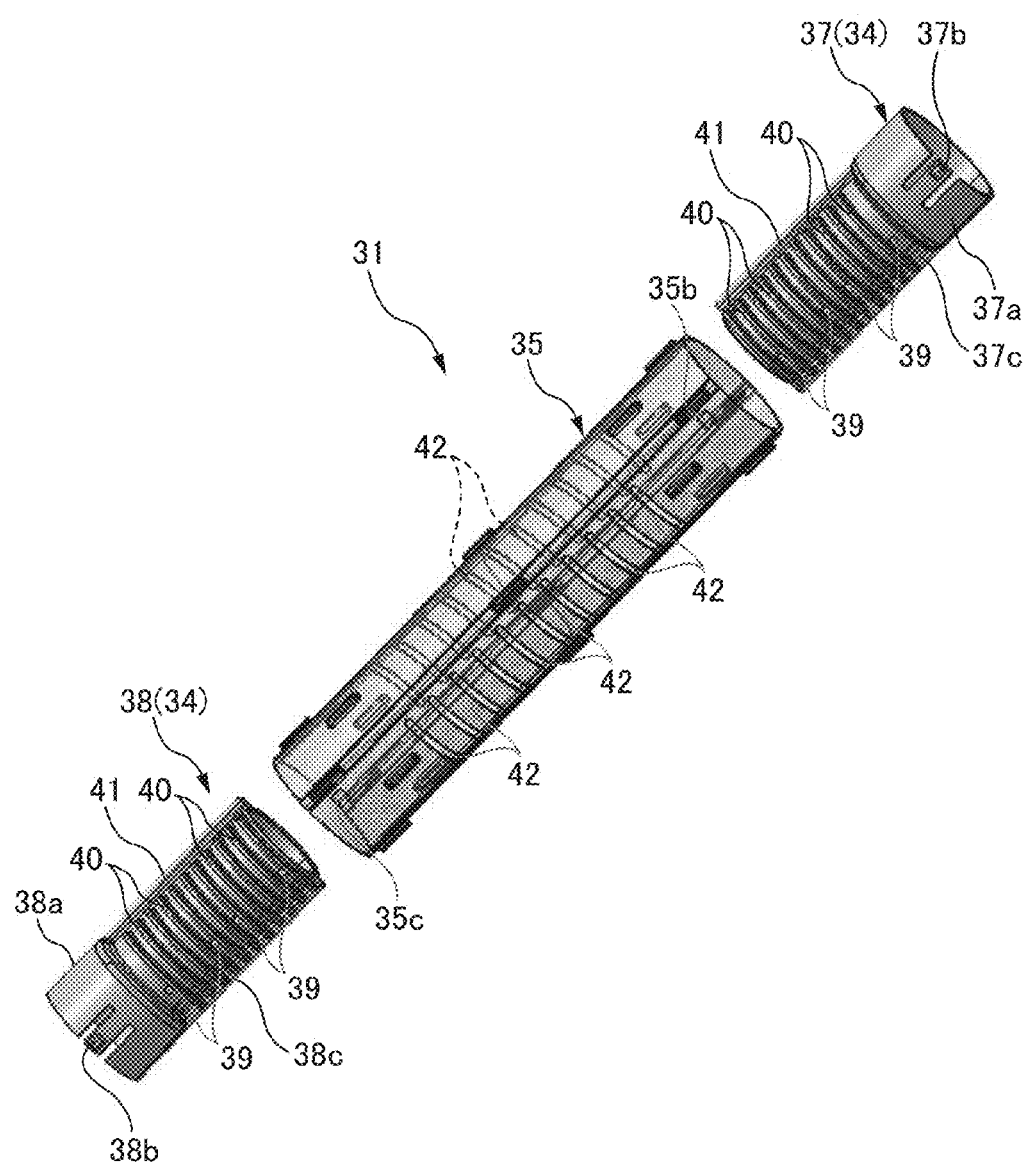
FIG. 6 is an exploded perspective view of the core.

As shown in FIGS. 5 and 6, the core 31 is formed as a resin double tube having an internal cylindrical member 34 and an external cylindrical member 35. Furthermore, a separation chamber 36 for separating oil mist from the blow-by gas BG is formed between the outer circumferential surface of the internal cylindrical member 34 and the inner circumferential surface of the external cylindrical member 35. Also, an inner space of the internal cylindrical member 34 (the inner space 33 of the core 31) corresponds to an upstream side channel through which the blow-by gas BG flows.

The internal cylindrical member 34 is divided, substantially at the center in the axial direction, into an upper internal cylindrical member 37 and a lower internal cylindrical member 38. The outer diameter of an upper end part 37a of the upper internal cylindrical member 37 is aligned with the inner diameter of the external cylindrical member 35, and the upper internal cylindrical member 37 is inserted into the inner space of the external cylindrical member 35 from the top opening of the external cylindrical member 35. In the inserted state, the upper end part 37a of the upper internal cylindrical member 37 intimately contacts the inner circumferential surface of the external cylindrical member 35. Also, an upper engaging claw 37b is provided in the upper end part 37a. The upper engaging claw 37b is used when attaching the upper internal cylindrical member 37 to the external cylindrical member 35 (an explanation will be given later).

The part below the upper end part 37a of the upper internal cylindrical member 37 (referred to as a main part 37c for the sake of convenience) is formed to have a diameter slightly smaller than the inner diameter of the external cylindrical member 35. Accordingly, in a state where the upper internal cylindrical member 37 is attached to the external cylindrical member 35, a gap is created between the main part 37c and the external cylindrical member 35. This gap is made the upper half portion of the separation chamber 36. A plurality of injection holes 39 for injecting the blow-by gas BG at an increased flow velocity are provided in the main part 37c. Also, strip protrusions 40 and 41 are provided on the outer circumferential surface of the main part 37c, and the protrusions guide the blow-by gas BG which has flowed into the separation chamber 36 from the injection holes 39 along an encircling direction or an axial direction. Additionally, the injection holes 39 and the strip protrusions 40 and 41 will be described later.

The outer diameter of a lower end part 38a of the lower internal cylindrical member 38 is aligned with the inner diameter of the external cylindrical member 35, and the lower internal cylindrical member 38 is inserted into the inner space of the external cylindrical member 35 from the lower end side of the external cylindrical member 35. The lower end part 38a of the lower internal cylindrical member 38 is formed in the same manner as the upper end part 37a of the upper internal cylindrical member 37, and intimately contacts the inner circumferential surface of the external cylindrical member 35. A lower engaging claw 38b is provided in the lower end part 38a. The lower engaging claw 38b is used when attaching the lower internal cylindrical member 38 to the external cylindrical member 35. The part above the lower end part 38a (referred to as a main part 38c for the sake of convenience) is formed in the same manner as the main part 37c of the upper internal cylindrical member 37, and injection holes 39 and strip protrusions 40 and 41 are formed thereto.

Then, when the upper internal cylindrical member 37 and the lower internal cylindrical member 38 are attached to the external cylindrical member 35, the lower end surface of the upper internal cylindrical member 37 and the upper end surface of the lower internal cylindrical member 38 are abutted against each other. The separation chamber 36 is thereby formed between the internal cylindrical member 34 and the external cylindrical member 35.

Of the external cylindrical member 35, a surface facing the injection holes 39 provided in the internal cylindrical member 34 is formed as a spraying surface 35a. The spraying surface 35a is a part where the blow-by gas BG injected from the injection holes 39 is sprayed. Since the spraying surface 35a of the present embodiment is the inner circumferential surface of the external cylindrical member 35, it is formed of a curved surface that is curved along the circumferential direction.

Also, an exhaust hole 42 is formed at a position different from the spraying surface 35a of the external cylindrical member 35 (a position away from the surface opposing the injection holes 39). The exhaust hole 42 is formed as an opening communicating the inside and the outside of the external cylindrical member 35, and corresponds to a gas discharge portion. That is, the exhaust hole 42 discharges, to outside the separation chamber 36, as the separated gas from which the oil OL has been separated, the blow-by gas BG (the sprayed gas) that is flowing through the separation chamber 36 after having been sprayed on the spraying surface 35a. As shown in FIG. 5, the exhaust hole 42 of the present embodiment is an elongated slit in the circumferential direction, and a plurality of exhaust holes 42 are provided being shifted from one another in the axial direction of the external cylindrical member 35.

As shown in FIG. 6, an upper engaging hole 35b is provided in the upper end lateral surface of the external cylindrical member 35, and a lower engaging hole 35c is provided in the lower end lateral surface of the external cylindrical member 35. The upper engaging hole 35b is a part where a hook portion of the upper engaging claw 37b fits in, and the lower engaging hole 35c is a part where a hook portion of the lower engaging claw 38b fits in. As shown in FIG. 5, when the upper internal cylindrical member 37 is inserted sufficiently into the inner space of the external cylindrical member 35, the hook portion of the upper engaging claw 37b fits into the upper engaging hole 35b. In this state, the movement of the upper internal cylindrical member 37 in the axial direction in the inner space of the external cylindrical member 35 is restricted. Likewise, when the hook portion of the lower engaging claw 38b fits into the lower engaging hole 35c, the movement of the lower internal cylindrical member 38 in the axial direction in the inner space of the external cylindrical member 35 is restricted.

Next, the injection holes 39, the strip protrusions 40 and 41, and a circumferential channel 43 partitioned by the injection holes 39 and the strip protrusions 40 and 41 will be described.

Figure 7:
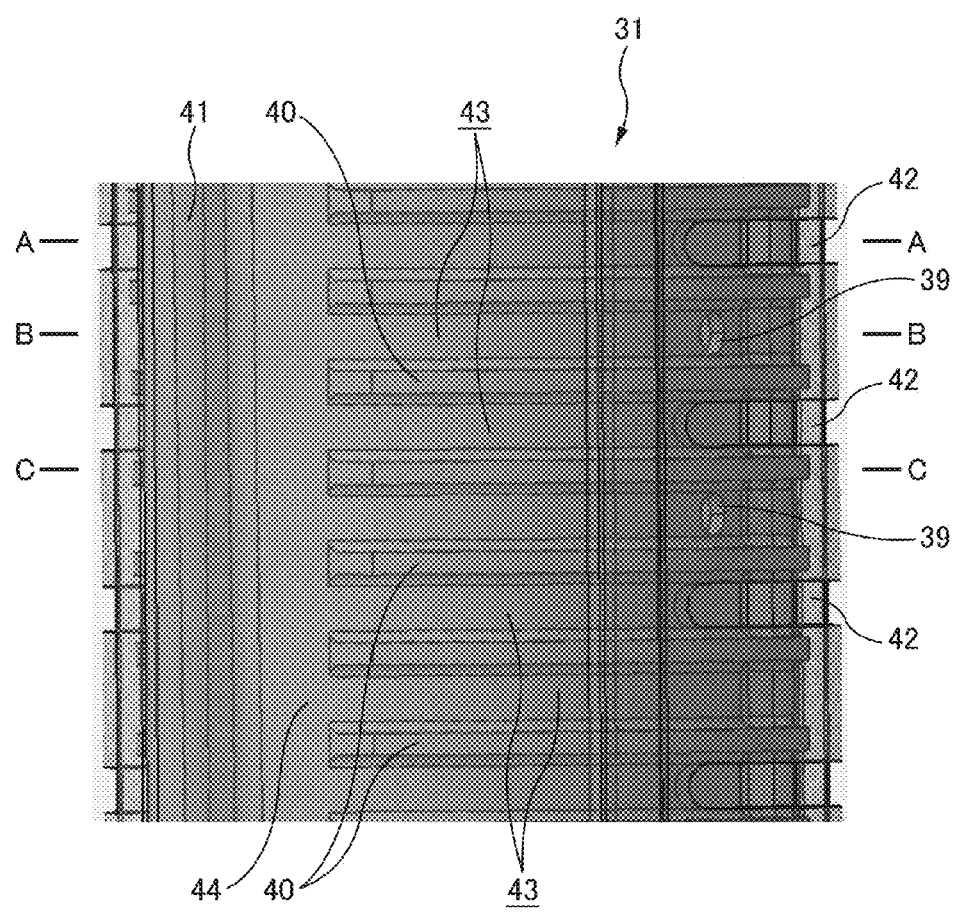
FIG. 7 is a partially enlarged view of the core seen through an external cylindrical member.
Figure 8:
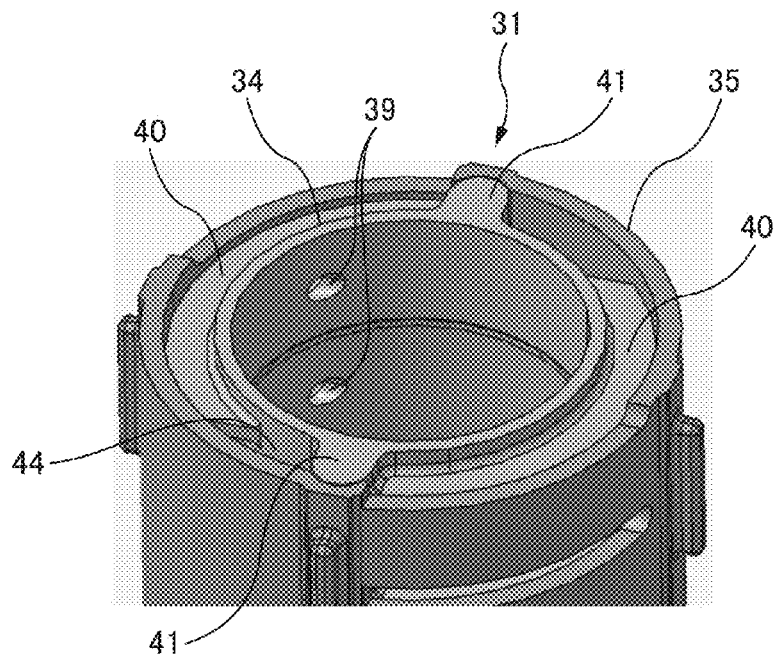
FIG. 8 is a cross-sectional view along line A in FIG. 7.
Figure 9:
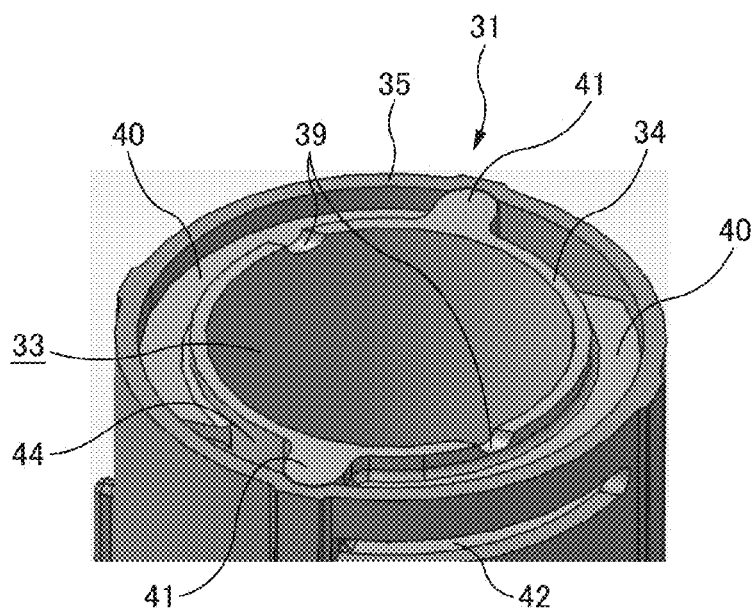
FIG. 9 is a cross-sectional view along line B in FIG. 7.
Figure 10:
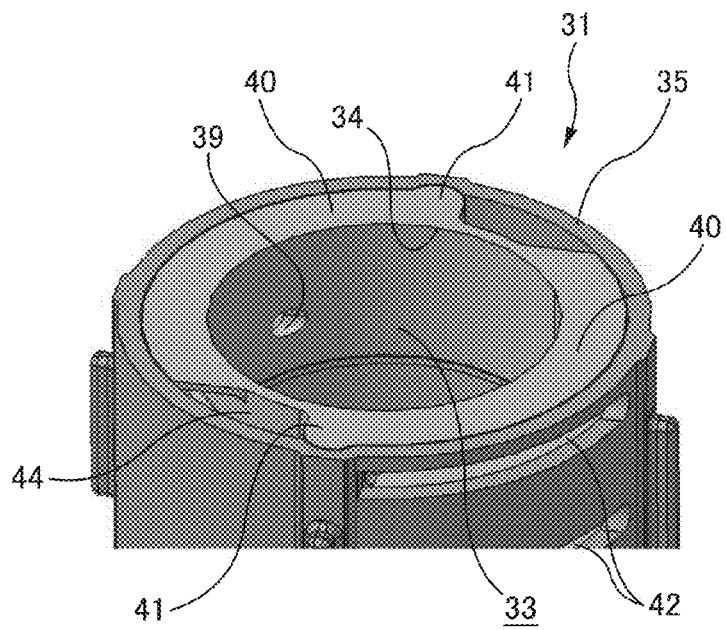
FIG. 10 is a cross-sectional view along line C in FIG. 7.
Figure 11:
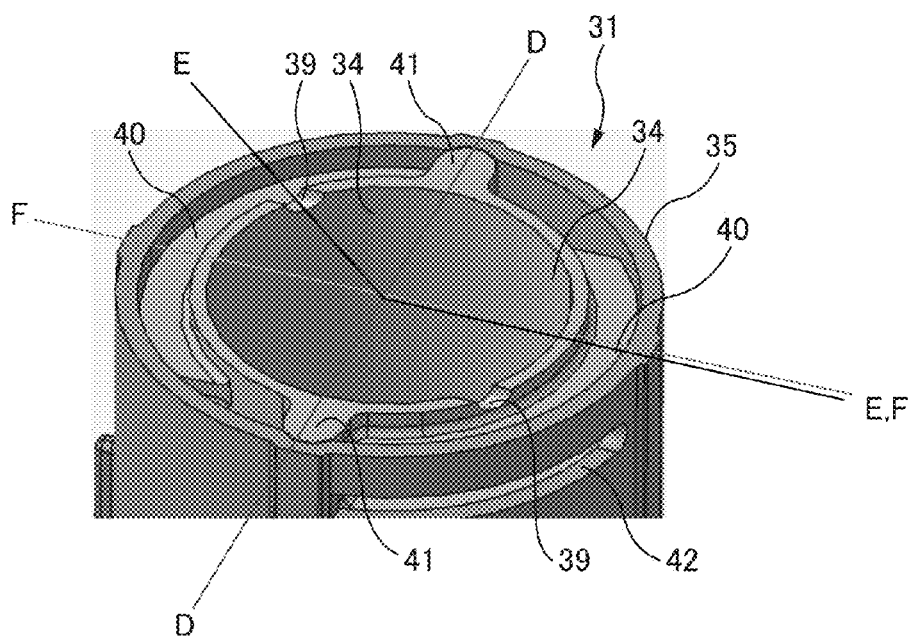
FIG. 11 is a cross-sectional view along line A in FIG. 7, showing positions at which cross-sectional views of FIGS. 12 to 14 are taken along.
Figure 13:
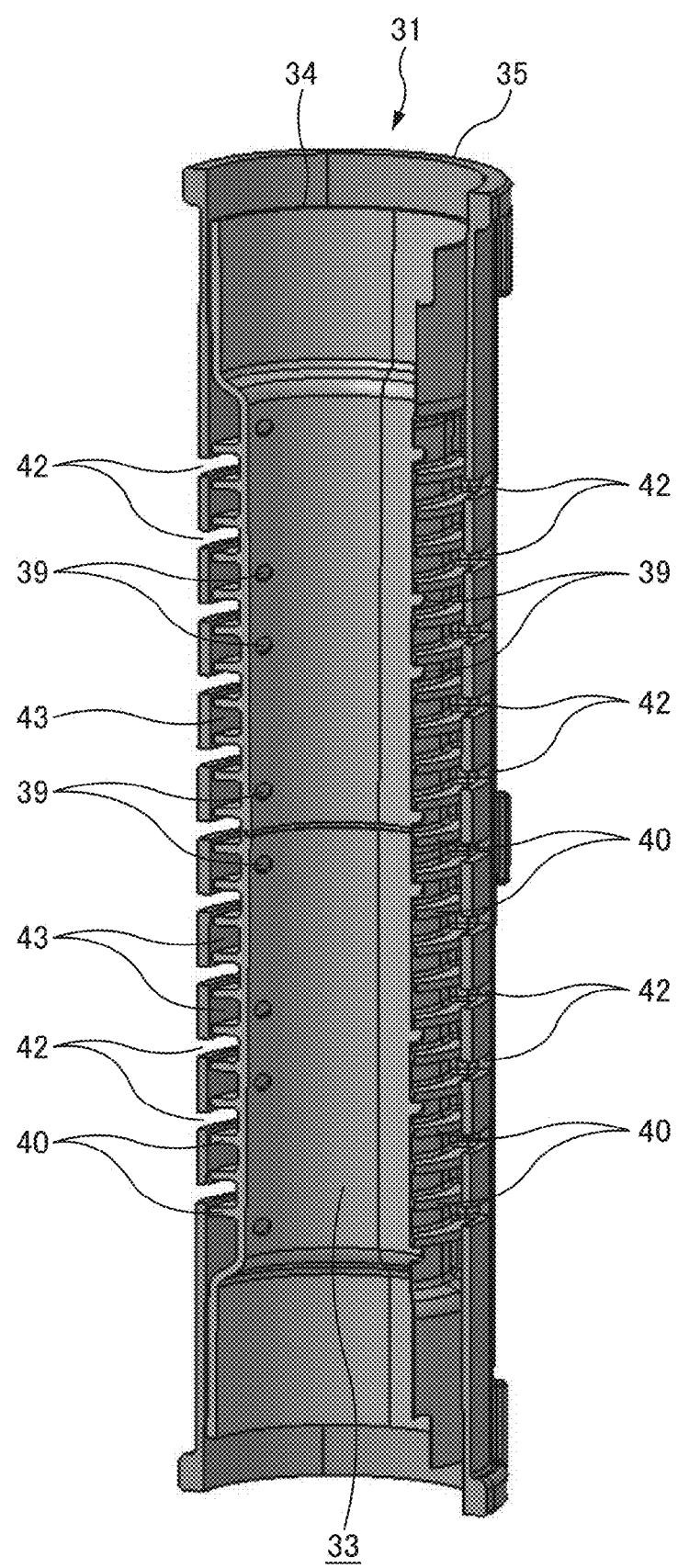
FIG. 13 is a cross-sectional view along line E in FIG. 11.
Figure 14:
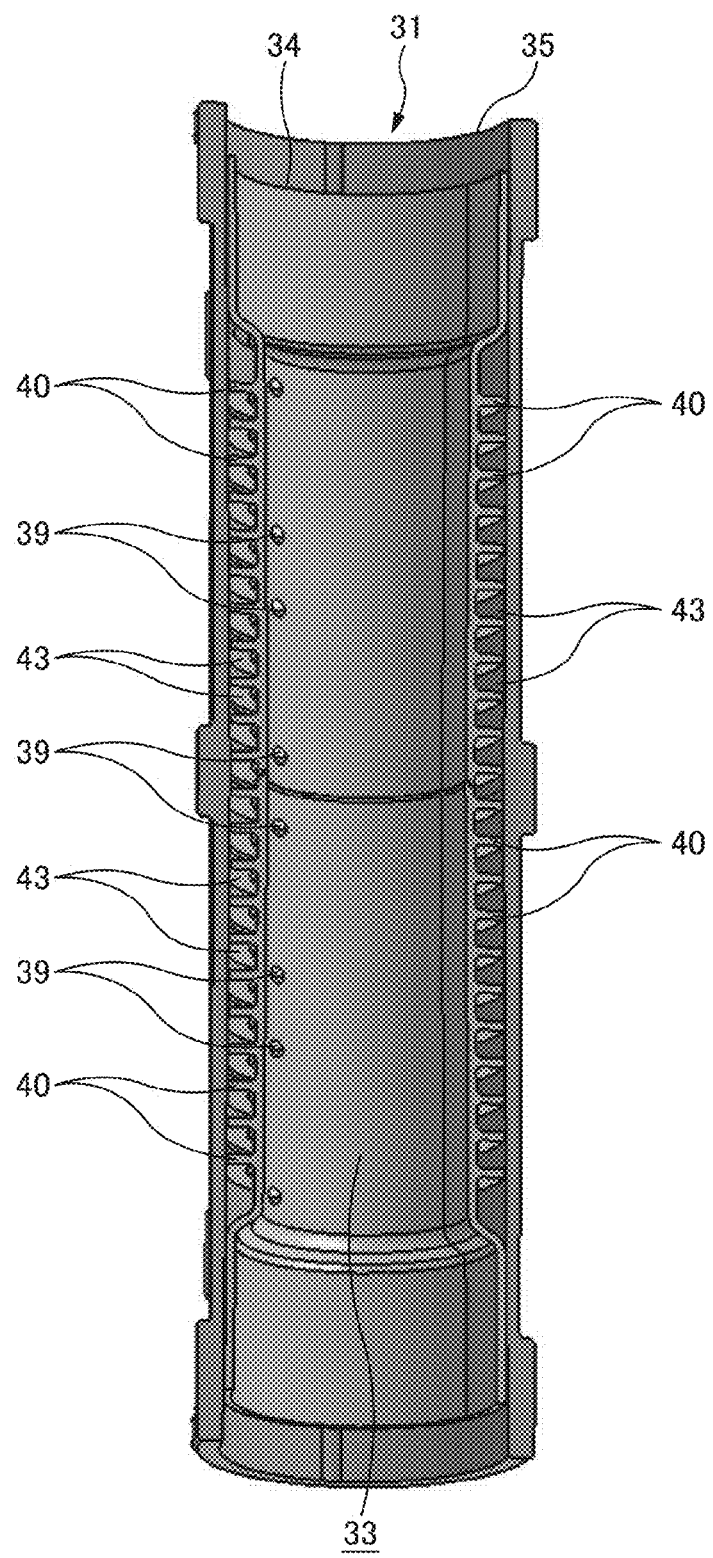
FIG. 14 is a cross-sectional view along line F in FIG. 11.

As shown in FIGS. 7, 13 and 14, a plurality of circumferential strip protrusions 40 are provided on the outer circumferential surface of the internal cylindrical member 34 in a protruding manner, along the circumferential direction orthogonal to the axial direction. These circumferential strip protrusions 40 are formed at a regular interval, across the axial direction of the internal cylindrical member 34 (the axial direction of the core 31). Also, the interval between the adjacent circumferential strip protrusions 40 is in accordance with the diameter of the injection holes 39 and the width of the exhaust hole 42. Moreover, the circumferential strip protrusions 40 have their end surfaces formed so as to intimately contact the inner wall surface of the external cylindrical member 35, and partition the circumferential channel 43 extending in the circumferential direction of the core 31. The circumferential channel 43 corresponds to a encircling channel, and guides the blow-by gas BG (the sprayed gas) along the encircling direction.

As described above, the injection holes 39 and the exhaust holes 42 are shifted from each other in the axial direction of the core 31. The circumferential strip protrusion 40 is provided at a position between the injection holes 39 and the exhaust holes 42. This structure prevents, by the circumferential strip protrusion 40, the blow-by gas BG injected from the injection holes 39 to directly flow to the exhaust holes 42.

Figure 12:
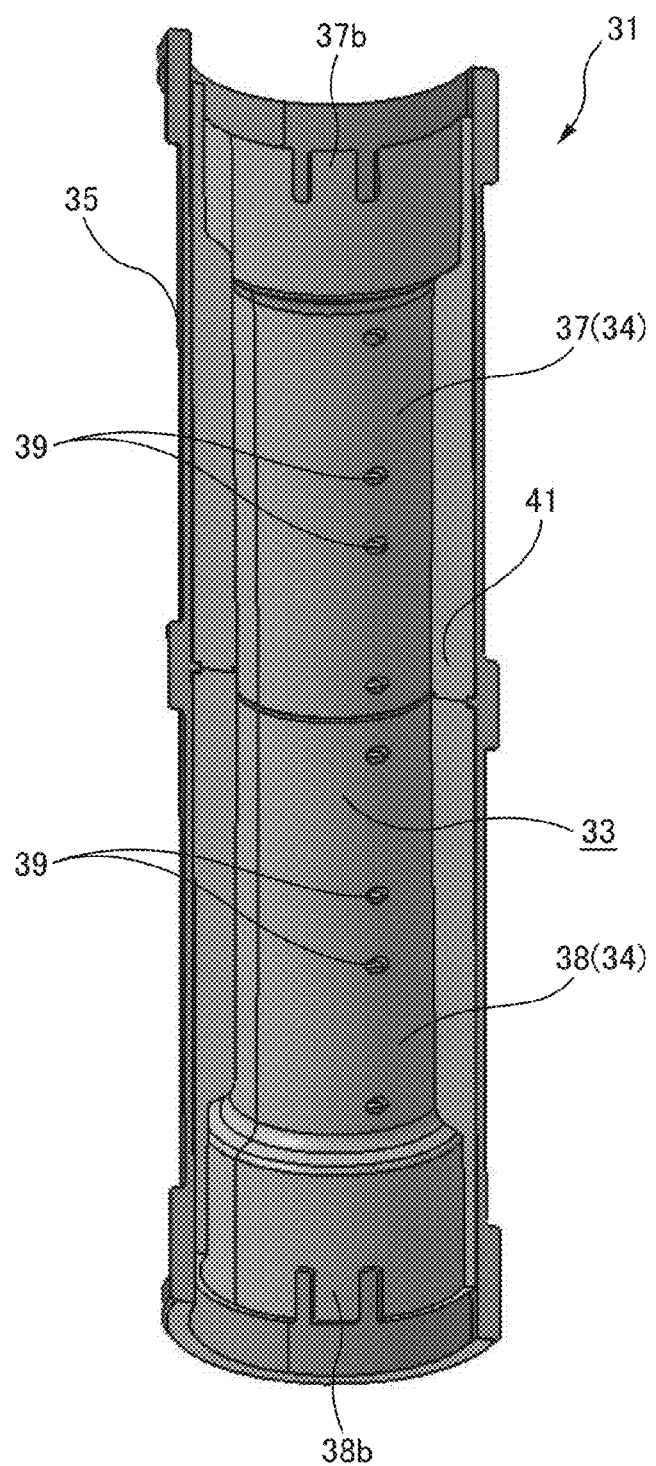
FIG. 12 is a cross-sectional view along line D in FIG. 11.

Furthermore, as shown in FIGS. 7 through 10, axial strip protrusions 41 are provided in a protruding manner on the outer circumferential surface of the internal cylindrical member 34, along the axial direction of the core 31. Two axial strip protrusions 41 are provided at 180 degrees angular intervals in the circumferential direction. As shown in FIG. 12, these axial strip protrusions 41 are provided with their end faces intimately contacting the inner wall surface of the external cylindrical member 35. Also, as shown in FIGS. 7 through 10, these axial strip protrusions 41 are provided with a gap between the end portions of the circumferential strip protrusions 40 in the circumferential direction. According to this structure, the circumferential channels 43 partitioned by each circumferential strip protrusion 40 communicate with one another in a communication space 44 closer than the axial strip protrusions 41.

Figure 15:
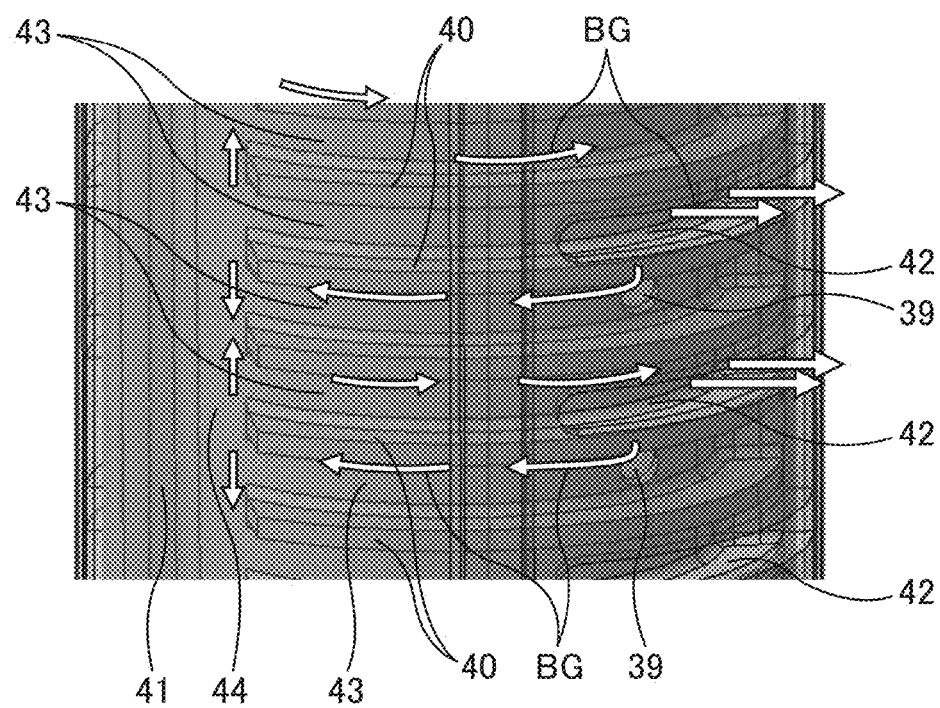
FIG. 15 is a partially enlarged view schematically showing the flow of gas in the core.

As shown in FIGS. 3 and 15, the blow-by gas BG injected from the injection holes 39 after being injected onto the spraying surface 35a of the external cylindrical member 35, flows in the circumferential direction (the encircling direction) along the circumferential channel 43 at which the injection holes 39 is opened. Then, when it reaches the communication space 44, the blow-by gas BG changes the direction of flow and flows into the circumferential channel 43 at which the exhaust hole 42 is opened. That is, after being injected from the injection holes 39, the blow-by gas BG flows to the communication space 44 through the circumferential channel 43, makes a U-turn in the communication space 44, and flows through another circumferential channel 43 to be discharged from the exhaust hole 42. Accordingly, in this example, the circumferential channel 43 at which the injection holes 39 is opened corresponds to a first encircling channel for causing the blow-by gas BG to flow in a first encircling direction, and the circumferential channel 43 at which the exhaust hole 42 is opened corresponds to a second encircling channel for causing the blow-by gas BG to flow in a second encircling direction opposite the first encircling direction.

Figure 16:
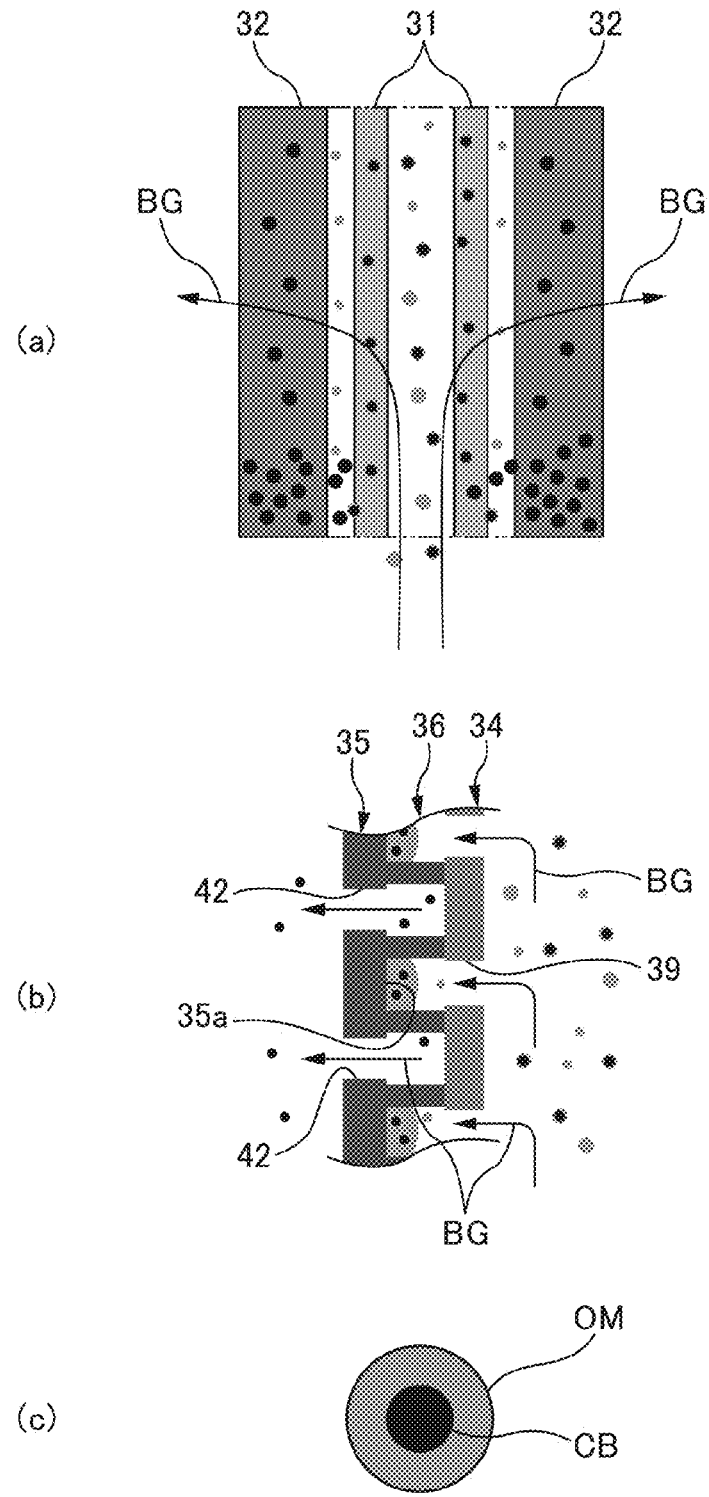
FIG. 16($a$) is a conceptual view schematically showing the flow of blow-by gas.

As described above, the blow-by gas BG from which oil has been removed by the separation unit 16 flows into the inner space of the core 31. This blow-by gas BG is purified by the core 31 and the filtering member 32 as shown in FIG. 16(a). That is, as shown in FIG. 16(c), oil mist OM, having carbon CB covered with oil as a core, is contained in the blow-by gas BG. Then, as shown in FIG. 16(b), when passing through the core 31, the blow-by gas BG is injected into the separation chamber 36 from the injection holes 39 provided in the internal cylindrical member 34. When the injected blow-by gas BG is sprayed onto the spraying surface 35a, the oil mist contained in the blow-by gas BG is condensed on the spraying surface 35a, and is separated from the blow-by gas BG. As shown in FIG. 3, the oil OL separated from the blow-by gas BG moves according to the flow of the blow-by gas BG, and moves through the circumferential channel 43 toward the communication space 44.

Here, as shown in FIGS. 1 and 2, the filter element 13 of the present embodiment is used in a standing position. That is, in the use state, one end of the core 31 in the axial direction is positioned lower than the other end. Thus, as shown in FIG. 3, the oil OL which has reached the communication space 44 is prevented from moving in the circumferential direction by the axial strip protrusion 41 and flows down the communication space 44 due to its own weight.

The oil OL which has flowed down the communication space 44 is stored in the lower end of the separation chamber 36. Here, in the present embodiment, since the oil OL is separated by the separation unit 16 on the upstream side, the amount of oil to be stored is not large. However, if the amount of storage grows large due to one reason or another, such as use over a long period of time, the oil OL is discharged to the outside (the filtering member 32) from the exhaust hole 42 provided at the lower end portion of the core 31. In this case, the exhaust hole 42 at the lowermost end functions also as an oil discharge portion.

As shown in FIG. 2, the oil OL discharged from the core 31 moves inside the filtering member 32 toward the outer circumferential side. The oil OL passes through the drain channel 23 provided in the housing 11, and is guided by the drain member 14. Then, the oil OL which has flowed down the narrowed portion 14a is returned to the engine 4 through the oil collection pipe 8 connected to the narrowed portion 14a.

Furthermore, the blow-by gas BG discharged from the exhaust hole 42 passes through the filtering member 32 and, at this time, the carbon contained in the blow-by gas BG is removed by filtration by the filtering member 32. The blow-by gas BG from which carbon and oil have been removed can thereby be returned to the air inlet side channel 5.

As described above, according to the present embodiment, the oil mist is condensed and separated from the blow-by gas BG by forming the core 31 with a double tube having the internal cylindrical member 34 and the external cylindrical member 35 and spraying the blow-by gas BG from the injection holes 39 of the internal cylindrical member 34 onto the spraying surface 35a of the external cylindrical member 35. In this manner, since the oil is separated using condensation, the efficiency is not reduced even if separation is performed over a long period of time. The blow-by gas BG is sprayed onto the condensed oil, and thus, the oil mist easily combines with the condensed oil. Accordingly, the efficiency of separation of oil from the blow-by gas BG can be increased.

Also, with the core 31, since the oil mist is separated by forming the separation chamber 36 inside a double tube, a small and efficient oil separator can be realized. Furthermore, since the blow-by gas BG from which oil has been separated is made to flow to the filtering member 32, deterioration due to the oil of the filtering member 32 can be suppressed.

Furthermore, the circumferential channels 43 are partitioned off by the plurality of circumferential strip protrusions 40 provided on the outer circumferential surface of the internal cylindrical member 34 and the blow-by gas BG injected from the injection holes 39 is guided by the circumferential channels 43 along the circumferential direction, and thus, the separation of oil can be promoted by the centrifugal separation effect by rotation. Also, the blow-by gas BG is led to the exhaust hole 42 after making a U-turn in the communication space 44, and this also promotes the separation of oil.

Moreover, since the axial strip protrusion 41 is provided along the axial direction of the core 31, oil flowing through the communication space 44 can be reliably made to flow down along the axial strip protrusion 41.

Next, the separation unit 16 will be described.

Figure 18:
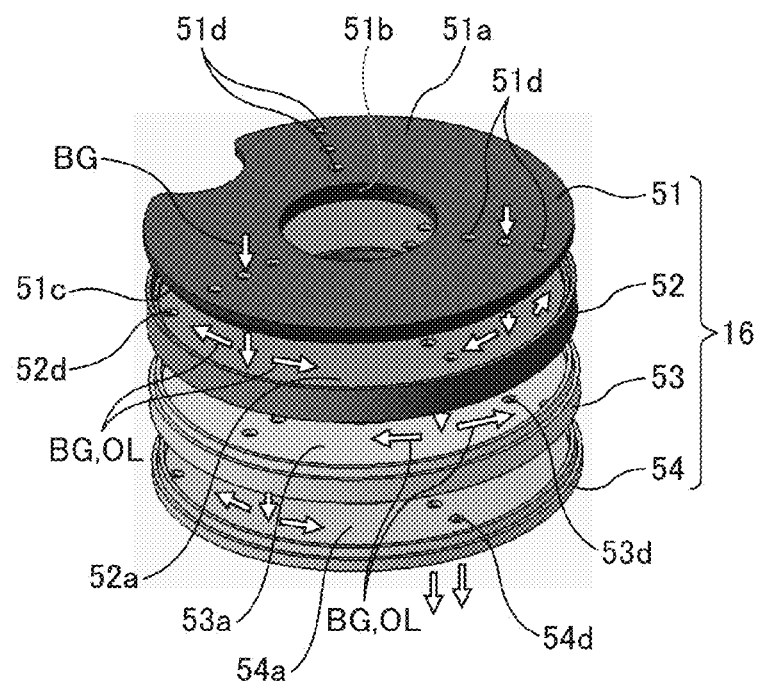
FIG. 18 is an exploded perspective view of the separation unit.
Figure 19:
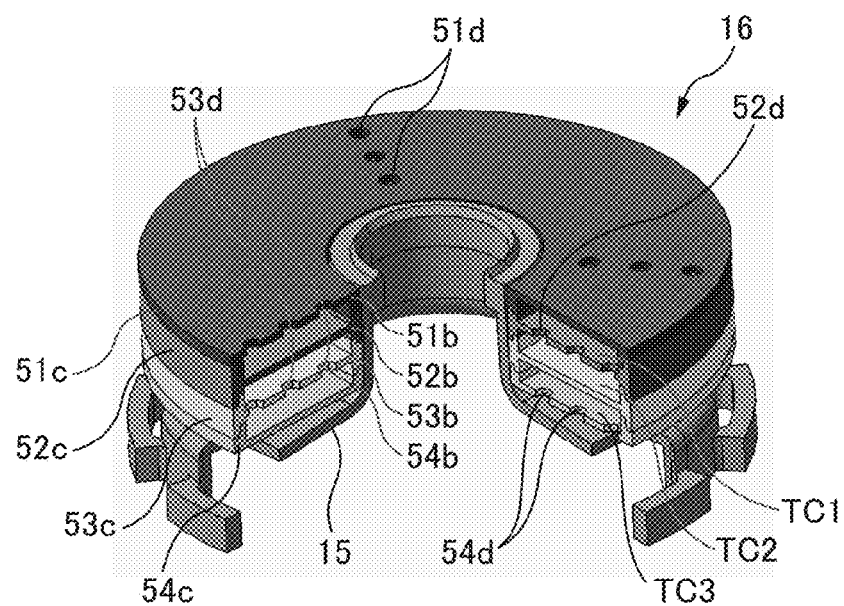
FIG. 19 is a perspective view showing the separation unit which is partially cut off.

As shown in FIG. 17, the separation unit 16 is formed by overlaying, in a through-thickness direction, a plurality of substantially disk-shaped members, each having a notch. Specifically, as shown in FIGS. 18 and 19, the separation unit 16 includes a ceiling member 51, a first intermediate member 52, a second intermediate member 53 and a bottom member 54. In the present embodiment, each of these members 51 to 54 is fabricated of resin.

The ceiling member 51 is a member that partitions a ceiling portion of the separation unit 16, and includes a ceiling plate 51a, an inner rib 51b and an outer rib 51c.

The ceiling plate 51a is a substantially doughnut-shaped plate having an arc-shaped notch, and is provided having a plurality of injection holes 51d penetrating in the through-thickness direction. These injection holes 51d are parts for injecting, at an increased flow velocity, the blow-by gas BG which has flowed from the upstream side. In the present embodiment, the injection holes 51d are formed being radially arranged from the center of the ceiling plate 51a. Specifically, three injection holes 51d are formed with gaps therebetween in the radial direction (the width direction of the encircling channel) to form an injection hole group, and the injection hole groups are formed at 120 degrees angular intervals in the circumferential direction.

The inner rib 51b is a protruding portion provided protruding downward (in the stacking direction of the members) from the edge of an opening provided in the ceiling plate 51a. This inner rib 51b is joined with an inner rib 52b of the first intermediate member 52. Also, the outer rib 51c is a protruding portion provided protruding downward at the outer circumferential edge of the ceiling plate 51a. This outer rib 51c is joined with an outer rib 52c of the first intermediate member 52. The ceiling plate 51a and a first intermediate plate 52a of the first intermediate member 52 are supported with a predetermined gap therebetween by the inner ribs 51b and 52b, and the outer ribs 51c and 52c.

The first intermediate member 52 is a member that is attached between the ceiling member 51 and the bottom member 54, and includes the first intermediate plate 52a, the inner rib 52b and the outer rib 52c.

The first intermediate plate 52a is a plate member having the same shape as the ceiling plate 51a, and a plurality of injection holes 52d are formed thereto. These injection holes 52d are also parts for injecting, at an increased flow velocity, the blow-by gas BG which has flowed from the upstream side, and are formed radially from the center of the first intermediate plate 52a. The injection holes 52d provided in the first intermediate plate 52a are also formed in a group of three with gaps therebetween in the radial direction to form an injection hole group, and the injection hole groups are formed at 120 degrees angular intervals in the circumferential direction. Also, the size of each injection hole 52d is the same as that of the injection hole 51d of the ceiling plate 51a. Here, the injection hole group of the first intermediate plate 52a is formed being shifted in the circumferential direction from the injection hole group of the ceiling plate 51a. The surface of the first intermediate plate 52a facing the injection hole group of the ceiling plate 51a thereby functions as a spraying surface onto which the blow-by gas BG is sprayed.

The inner rib 52b is a protruding portion provided protruding upward and downward from the edge of an opening provided in the first intermediate plate 52a. The upper portion of the inner rib 52b is joined with the inner rib 51b of the ceiling member 51, and the lower portion is joined with an inner rib 53b of the second intermediate member 53. The outer rib 52c is a protruding portion protruding upward and downward from the outer circumferential edge of the first intermediate plate 52a. The upper portion of the outer rib 52c is joined with the outer rib 51c of the ceiling member 51, and the lower portion is joined with an outer rib 53c of the second intermediate member 53.

Like the first intermediate member 52, the second intermediate member 53 is a member attached between the ceiling member 51 and the bottom member 54, and includes a second intermediate plate 53a, the inner rib 53b and the outer rib 53c. The position where the injection hole group of the second intermediate member 53 is formed is different from that of the injection hole group of the first intermediate plate 52a. That is, the injection hole group of the second intermediate plate 53a is provided at the same position as the injection hole group of the ceiling plate 51a in the circumferential direction. The surface of the second intermediate plate 53a facing the injection hole group of the first intermediate plate 52a thereby functions as a spraying surface onto which the blow-by gas BG is sprayed. Additionally, other parts of the second intermediate member 53 are structured in the same manner as those of the first intermediate member 52, and an explanation thereof is omitted.

The bottom member 54 is a member for partitioning the bottom portion of the separation unit 16, and includes a bottom plate 54a, an inner rib 54b and an outer rib 54c.

The bottom plate 54a is a plate member having the same shape as the ceiling plate 51a, and a plurality of discharge holes 54d are formed thereto. These discharge holes 54d are parts for discharging, to the outside of the separation unit 16, the blow-by gas BG after separation of the oil OL (the separated gas) and the condensed oil OL, and functions both as a gas discharge portion and as an oil discharge portion. These discharge holes 54d are also formed radially from the center of the bottom plate 54a. That is, the discharge holes 54d are formed in a group of three with gaps therewith in the radial direction to form a discharge hole group, and the discharge hole groups are formed at 120 degrees angular intervals in the circumferential direction.

Also, the size of each discharge hole 54$d$ is the same as that of the injection holes 39 of the ceiling plate 51$a$ and each intermediate plate. Here, the discharge hole group of the bottom plate 54$a$ is formed at the same position as the injection hole group of the first intermediate plate 52$a$ in the circumferential direction, and at a position different from that of the injection hole group of the second intermediate plate 53$a$. Thereby the surface of the bottom plate 54$a$ facing the injection hole group of the second intermediate plate 53$a$ thereby functions as a spraying surface onto which the blow-by gas BG is sprayed.

The inner rib 54$b$ is a protruding portion provided protruding upward from the edge of an opening provided in the bottom plate 54$a$. The inner rib 54$b$ is joined with the inner rib 53$b$ of the second intermediate member 53. Also, the outer rib 54$c$ is a protruding portion provided protruding upward from the outer circumferential edge of the bottom plate 54$a$. The outer rib 54$c$ is joined with the outer rib 53$c$ of the second intermediate member 53.

As shown in FIG. 19, when the ceiling member 51, the first intermediate member 52, the second intermediate member 53 and the bottom member 54 are integrated by hermetically joining the inner ribs 51$b$ to 54$b$, and the outer ribs 51$c$ to 54$c$, the inner ribs 51$b$ to 54$b$ form an inner lateral plate, and the outer ribs 51$c$ to 54$c$ form an outer lateral plate. The ceiling plate 51$a$, the first intermediate plate 52$a$, the second intermediate plate 53$a$ and the bottom plate 54$a$ are supported by the inner lateral plate and the outer lateral plate while being stacked with spaces therebetween.

Moreover, a flat space curved in such a way as to circulate and guide the blow-by gas BG is formed between the ceiling plate 51$a$ and the first intermediate plate 52$a$, between the first intermediate plate 52$a$ and the second intermediate plate 53$a$, and between the second intermediate plate 53$a$ and the bottom plate 54$a$. The flat space corresponds to a separation chamber for separating oil mist from the blow-by gas BG, and also, to a encircling channel curved in the encircling direction to guide the blow-by gas BG. The flat space of the present embodiment includes three spaces, the top, the middle and the bottom. For the sake of convenience, in the following description, the flat space at the top, the flat space in the middle and the flat space at the bottom will be referred to as a top encircling channel TC1, a middle encircling channel TC2 and a bottom encircling channel TC3, respectively.

Figure 20:
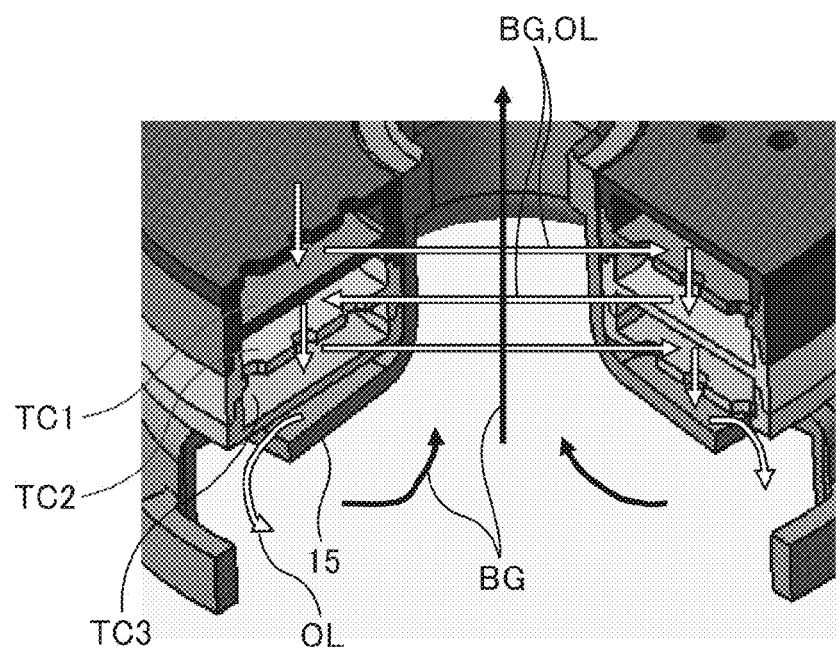
FIG. 20 is a conceptual view schematically showing the flow of oil mist.

As shown in FIG. 2, the blow-by gas BG which has flowed into the oil separator unit 3 from the upper breather pipe 2$a$ flows into the separation unit 16 from a space above the separation unit 16 (the upper gas channel). That is, as shown in FIGS. 18 and 20, the blow-by gas BG flows into the top encircling channel TC1 from the injection hole group of the ceiling plate 51$a$. Here, since the diameter of each injection hole 51$d$ is sufficiently small, the flow velocity of the blow-by gas BG is increased at the time of the blow-by gas BG passing through each injection hole 51$d$.

The blow-by gas BG which has flowed into the top encircling channel TC1 is sprayed on the spraying surface of the first intermediate plate 52$a$. When the blow-by gas BG is sprayed, the oil mist contained in the blow-by gas BG is condensed on the surface of the first intermediate plate 52$a$ and is separated from the blow-by gas BG. Then, the oil OL separated from the blow-by gas BG is pushed by the blow-by gas BG and flows on the surface of the first intermediate plate 52$a$. In the cutaway range in FIG. 20, the separated oil flows through the top encircling channel TC1 (the first encircling channel) in the right direction (the first encircling direction).

The blow-by gas BG and the oil OL which have flowed through the top encircling channel TC1 flow into the middle encircling channel TC2 from the injection hole group of the first intermediate plate 52$a$, and are sprayed onto the spraying surface of the second intermediate plate 53$a$. Here, the oil OL that is sprayed adheres to the spraying surface of the second intermediate plate 53$a$. Also, the oil mist contained in the blow-by gas BG is separated from the blow-by gas BG by condensing on the surface of the second intermediate plate 53$a$ or by adhering to the oil OL that is already condensed. Then, the oil OL which is separated from the blow-by gas BG is pushed by the blow-by gas BG, and flows on the surface of the second intermediate plate 53$a$. In the cutaway range in FIG. 20, the separated oil OL flows through the middle encircling channel TC2 (the second encircling channel) in the left direction (the second encircling direction).

The blow-by gas BG and the oil which have moved through the middle encircling channel TC2 flow into the bottom encircling channel TC3 from the injection hole group of the second intermediate plate 53$a$, and are sprayed onto the spraying surface of the bottom plate 54$a$. Also at this time, the sprayed oil OL adheres to the spraying surface of the bottom plate 54$a$. Also, the oil mist contained in the blow-by gas BG is separated. Then, the oil OL separated from the blow-by gas BG is pushed by the blow-by gas BG, and flows on the surface of the bottom plate 54$a$. In the cutaway range in FIG. 20, the separated oil OL flows through the bottom encircling channel TC3 (the first encircling channel) in the right direction (the first encircling direction).

The blow-by gas BG and the oil OL which have moved through the bottom encircling channel TC3 are discharged to the outside of the separation unit 16 from the discharge hole group of the bottom plate 54$a$. In the present embodiment, the hem of the separation unit holder 15 is at a position facing the discharge hole group. Thus, the oil OL discharged from the discharge hole group flows along the downward slope surface of the hem, and flows down to the drain channel 23. On the other hand, the blow-by gas BG from which the oil OL has been separated rises in the inner space of the separation unit holder 15. Then, as shown in FIG. 2, the blow-by gas BG flows into the inner space 33 of the core 31, and further separation of oil OL is performed in the core 31, as described above.

As described, in the present embodiment, the separation unit 16 is formed from the ceiling plate 51$a$, the first intermediate plate 52$a$, the second intermediate plate 53$a$, the bottom plate 54$a$, the inner lateral plate (the inner ribs 51$b$ to 54$d$) and the outer lateral plate (the outer rib 51$c$ to 54$c$). The ceiling plate 51$a$, the first intermediate plate 52$a$, the second intermediate plate 53$a$ and the bottom plate 54$a$ are hermetically joined by the inner lateral plate and the outer lateral plate while being stacked with spaces therebetween. Also, the top encircling channel TC1 is formed from the ceiling plate 51$a$, the first intermediate plate 52$a$, the inner lateral plate and the outer lateral plate. Likewise, the middle encircling channel TC2 is formed from the first intermediate plate 52$a$, the second intermediate plate 53$a$, the inner lateral plate and the outer lateral plate, and the bottom encircling channel TC3 is formed from the second intermediate plate 53$a$, the bottom plate 54$a$, the inner lateral plate and the outer lateral plate.

Moreover, the blow-by gas BG is sprayed from the injection hole group of the ceiling plate 51$a$ toward the spraying surface of the first intermediate plate 52$a$, and oil is separated from the blow-by gas BG by condensation. Oil is likewise separated from the blow-by gas BG by spraying the blow-by gas BG from the injection hole group of the first intermediate plate 52a toward the spraying surface of the second intermediate plate 53a, or spraying the blow-by gas BG from the injection hole group of the second intermediate plate 53a toward the spraying surface of the bottom plate 54a.

Since this separation unit 16 separates the oil OL using condensation, the efficiency is not easily reduced even if separation is performed over a long period of time. The blow-by gas BG is sprayed onto the condensed oil OL, and thus, the oil mist easily combines with the condensed oil OL. Accordingly, the efficiency of separation of the oil OL from the blow-by gas BG can be increased.

With this separation unit 16, since the plate members 51a to 53a where the injection holes 51d to 53d are formed are stacked on one another with spaces therebetween, the unit can be easily miniaturized even if several tiers of encircling channels are provided. Also, since the channels TC1 to TC3 through which the blow-by gas BG flows are curved and the blow-by gas BG are made to circulate, the separation of the oil OL can be promoted also by the centrifugal force occurring at the time of encircling. This enables to increase the separation efficiency. Furthermore, the encircling directions of a plurality of tiers of encircling channels TC1 to TC3 are opposite with respect to the adjacent tiers, and this also allows the unit to be easily miniaturized.

Moreover, with respect to the injection holes 51d to 53d, and the discharge holes 54d, since these holes are formed being aligned in the width direction of the encircling channels crossing the encircling direction of the blow-by gas BG, the moving distance of the blow-by gas BG can be made long, and accordingly, separation of the oil OL can be promoted.

Heretofore, the preferred embodiment of the present invention has been described. However, this embodiment is to facilitate the understanding of the present invention, and is not intended to limit the interpretation of the present invention. The present invention may be changed and modified within the spirit of the invention, and its equivalents are also included. For example, the following structure is conceivable.

Figure 21:
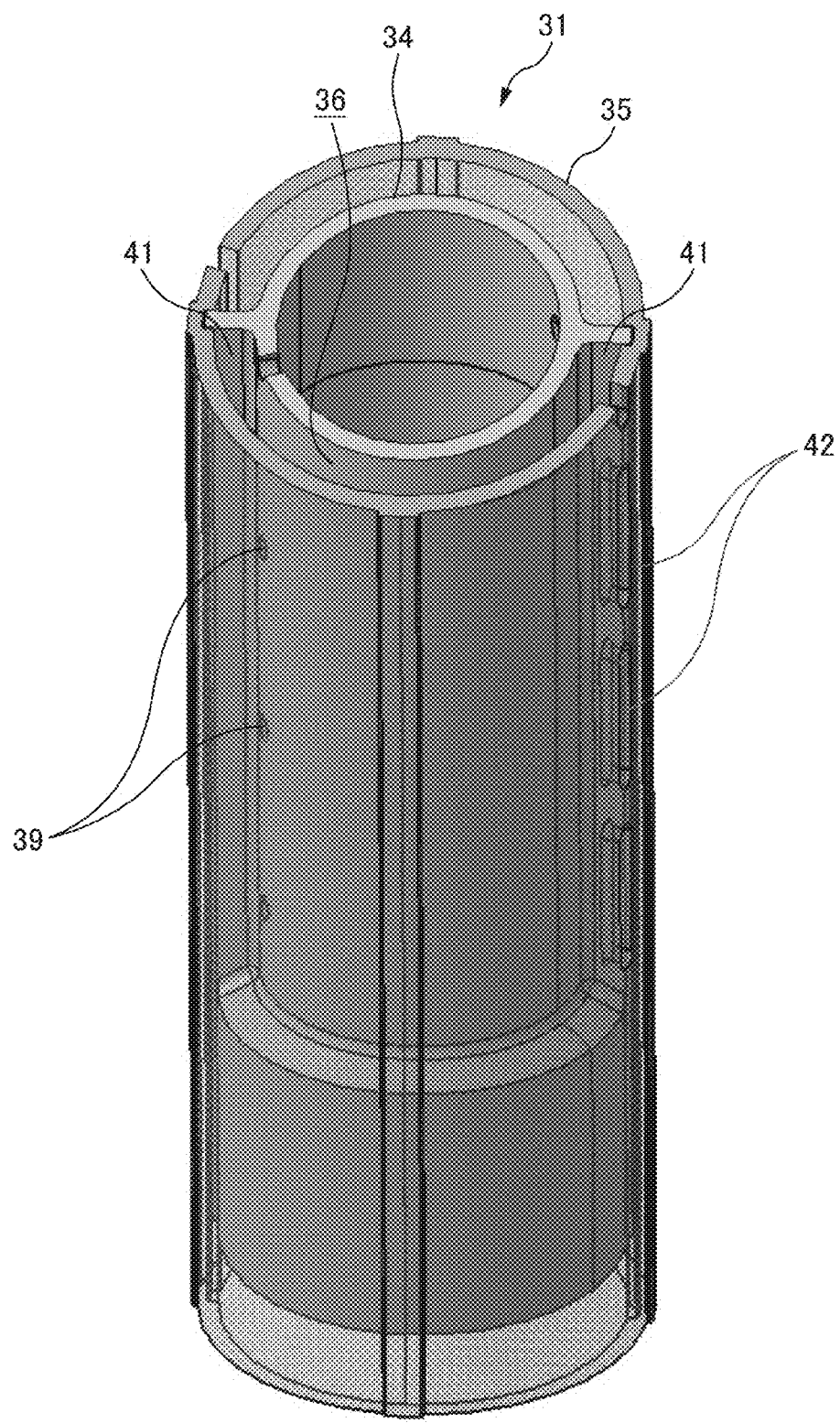
FIG. 21 is a perspective view for describing a modified example of the core.

With respect to the core 31, in the embodiment described above, a plurality of circumferential channels 43 are partitioned in the separation chamber 36 by providing a plurality of circumferential strip protrusions 40 on the outer circumferential surface of the internal cylindrical member 34, but the structure is not limited to such. For example, as shown in FIG. 21, the exhaust hole 42 provided in the external cylindrical member 35 may be shifted in the circumferential direction of the core 31 from the position where the injection hole 39 is formed, without providing the circumferential strip protrusion 40 to the internal cylindrical member 34. In this case, the exhaust hole 42 is preferably a slit elongated in the axial direction of the core 31. This is to easily secure the moving distance for the blow-by gas BG after it is sprayed onto the spraying surface. Also, in this case, the axial strip protrusions 41 provided near the injection holes 39 and the exhaust hole 42, respectively, are preferably arranged in such a manner as to sandwich the space from the injection holes 39 to the exhaust hole 42 in the separation chamber 36 from the outer sides in the circumferential direction of the core 31. According to this structure, since the range where the blow-by gas BG flows is restricted by the axial strip protrusions 41, unused space can be reduced.

Figure 22:
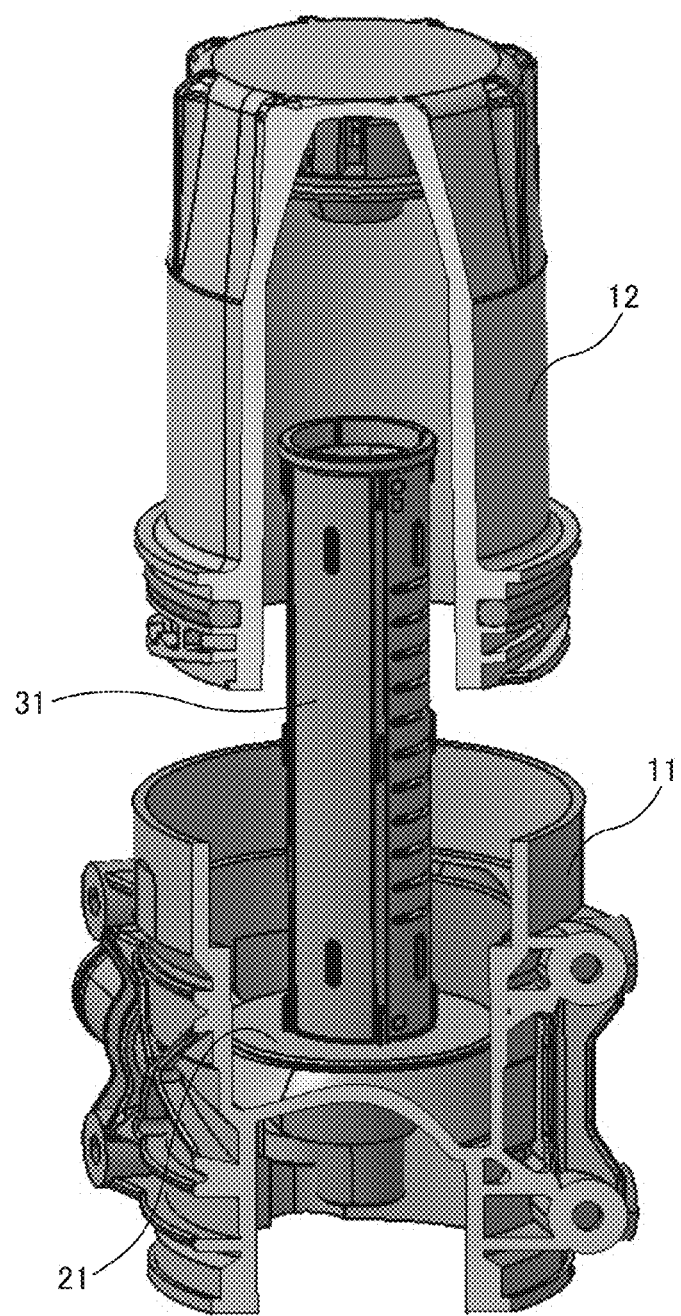
FIG. 22 is a view for describing a modified example where the core is integrally provided in a housing.
Figure 23:
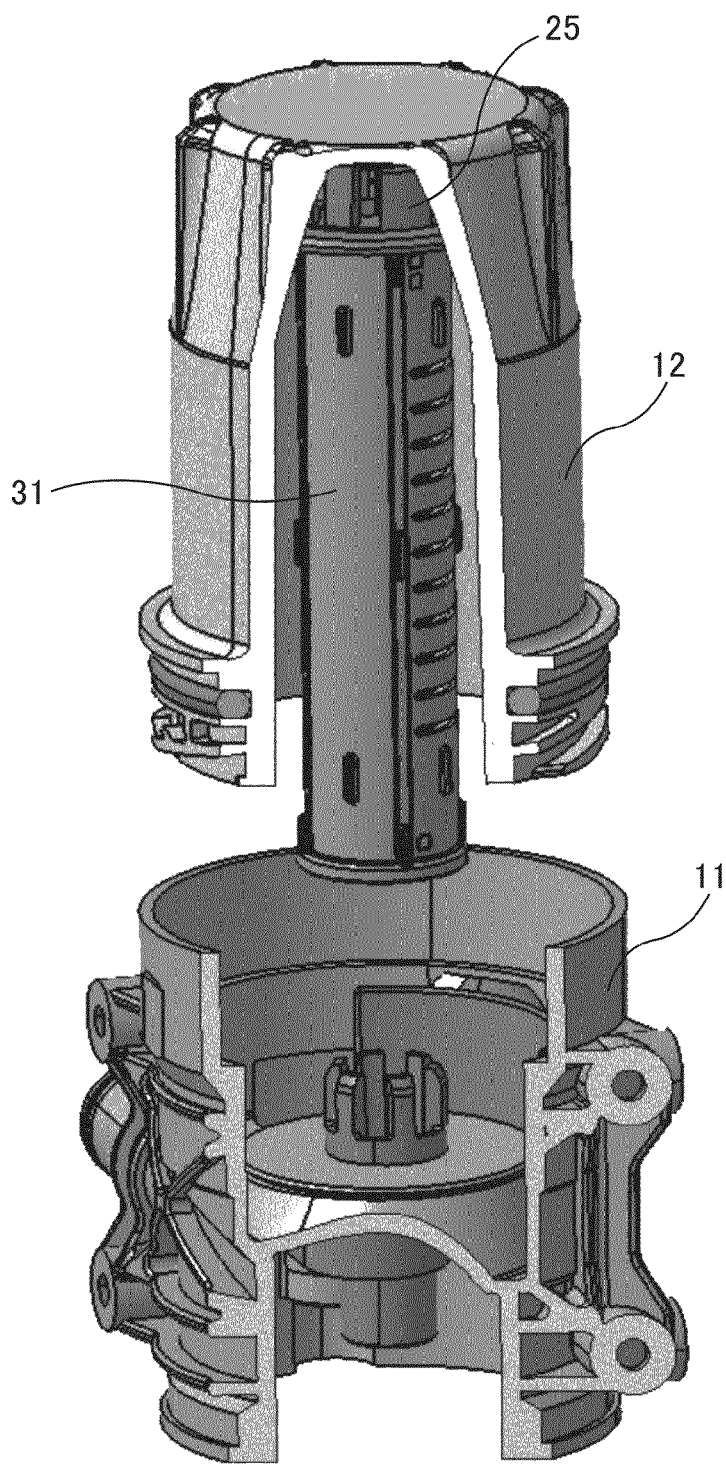
FIG. 23 is a view for describing a modified example where the core is integrally provided in a cap member.

Also with respect to the core 31, in the embodiment described above, a structure is illustrated where the core 31 is provided integrally with the filter element 13, but the structure is not limited to such. For example, as shown in FIG. 22, the core 31 may be provided integrally to the housing 11. Similarly, as shown in FIG. 23, the core 31 may be provided integrally to the cap member 12. In the case of providing the core 31 to the housing 11, the core 31 may be integrated by being joined to the base 21. Also, in the case of providing the core 31 to the cap member 12, the upper end portion of the core 31 may be integrated by being joined to the pressing/holding portion 25. Additionally, in any of the modified examples, the filter element 13 not having the core 31 is used, and the core 31 is attached before the cap member 12 is attached to the housing 11.

Figure 24:
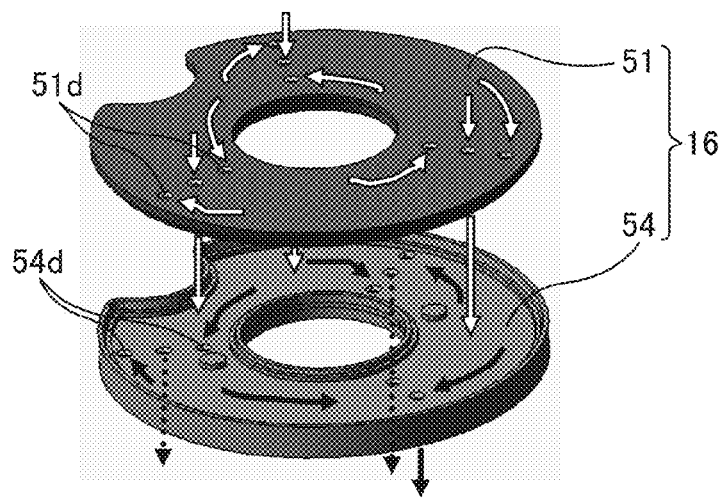
FIG. 24 is a view for describing a modified example of the separation unit with a single tier of encircling channel.
Figure 25:
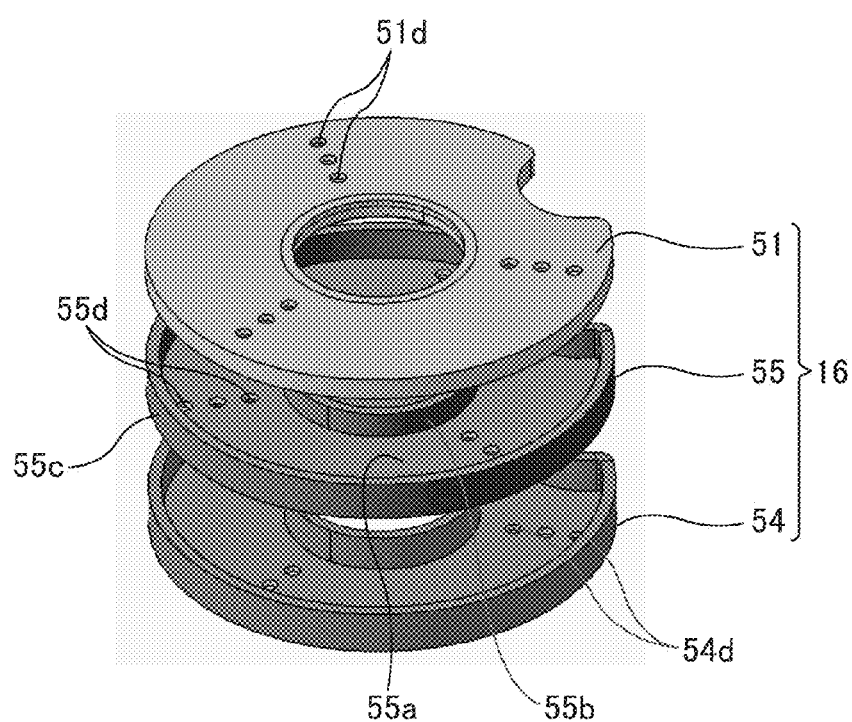
FIG. 25 is a view for describing a modified example of the separation unit with two tiers of encircling channels.

With respect to the separation unit 16, in the embodiment described above, that provided with the three tiers of encircling channels TC1 to TC3 is illustrated, but the structure is not limited to such. For example, as shown in FIG. 24, the separation unit 16 may be formed from the ceiling member 51 and the bottom member 54, and one tier of encircling channel may be provided. Also, as shown in FIG. 25, the separation unit 16 may be formed from the ceiling member 51, an intermediate member 55 and the bottom member 54, and two tiers of encircling channels may be provided. Additionally, similar to the first intermediate member 52 and the second intermediate member 53, the intermediate member 55 includes an intermediate plate 55a, an inner rib 55b, an outer rib 55c and injection holes 55d. In any of the modified examples, oil mist can be separated from the blow-by gas BG by spraying the blow-by gas BG onto the spraying surface.

Figure 26:
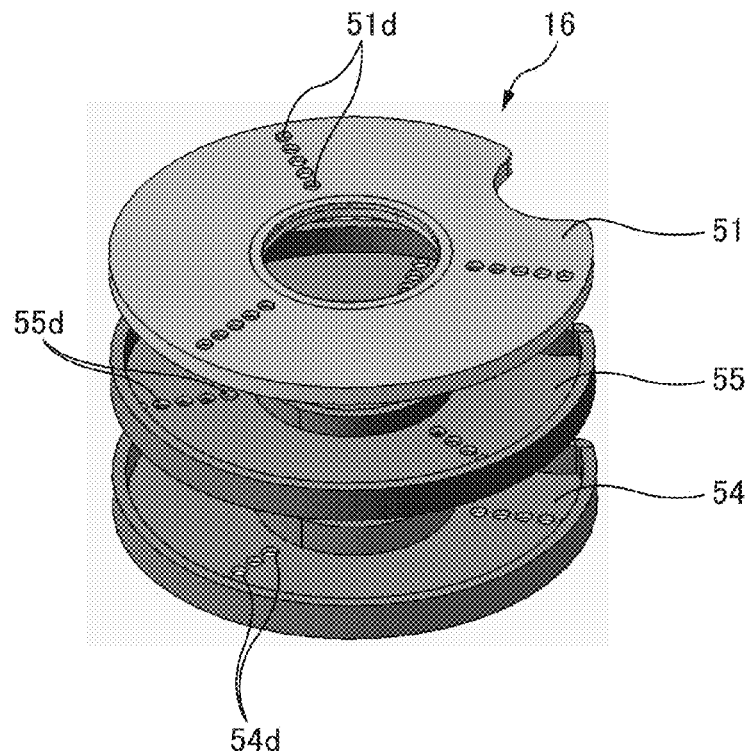
FIG. 26 is a view for describing a modified example with increased numbers of injection holes, intermediate injection holes and discharge holes.
Figure 27:
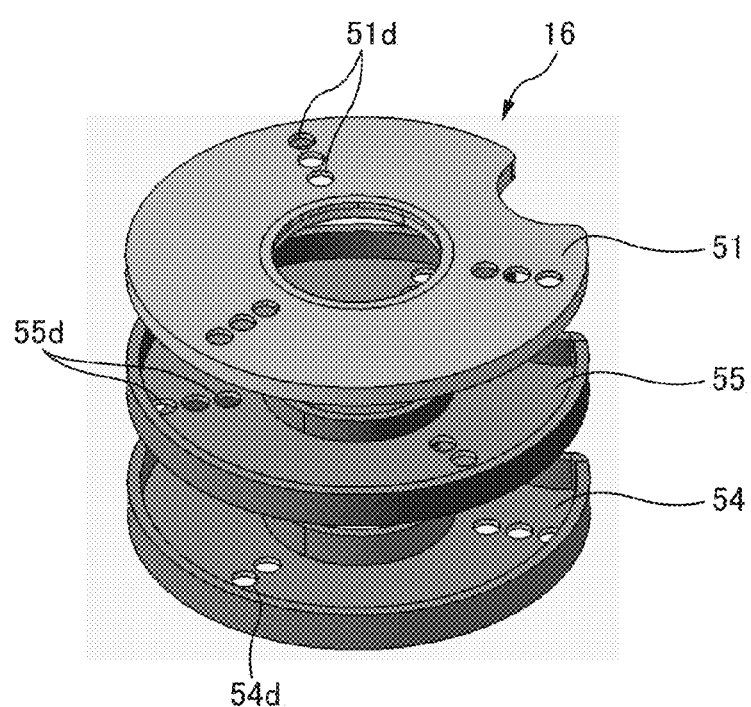
FIG. 27 is a view for describing a modified example where the sizes of the injection holes, the intermediate injection holes and the discharge holes are changed.

Furthermore, with respect to the separation unit 16, the size and number of the injection holes and the discharge holes may be determined as appropriate according to the property of the blow-by gas BG for which separation is to be performed. For example, as shown in FIG. 26, one injection hole group may be formed from five injection holes 51d or 55d, or one discharge hole group may be formed from five discharge holes 54d. Also, as shown in FIG. 27, the size of each injection hole 51d or 55d, or of each discharge hole 54d may be made larger than that in the embodiment described above. Additionally, the number of injection hole groups or the discharge hole groups is not limited to the number in the embodiment described above. For example, two injection hole groups or two discharge hole groups may be provided at 180 degrees angular intervals, or four injection hole groups or four discharge hole groups may be provided at 90 degrees angular intervals.

Figure 28:
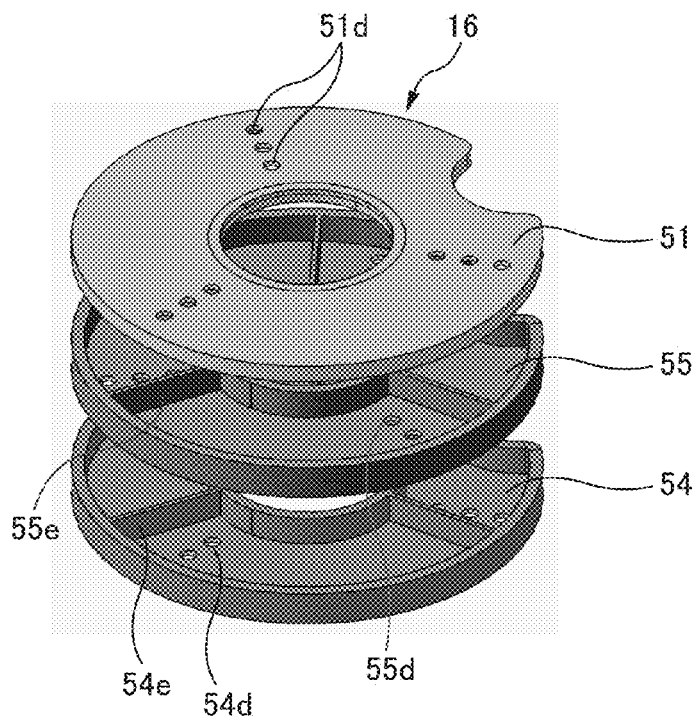
FIG. 28 is a view for describing a modified example where partition plates are provided in encircling channels.

Furthermore, as shown in FIG. 28, with respect to the encircling channel of the separation unit 16, partition plates 54e and 55e may be provided in the radial direction, and the encircling channel may be partitioned into a plurality of fan-shaped regions. In this example, three partition plates 54e and 55e are provided at 120 degrees angular intervals. The encircling channel is partitioned into three fan-shaped regions by these partition plates 54e and 55e. Also, the injection hole group and the discharge hole group are formed near the partition plates 54e and 55e. The performance for separation of the oil OL from the blow-by gas BG can be enhanced also by providing a plurality of fan-shaped regions in this manner.

Figure 29:
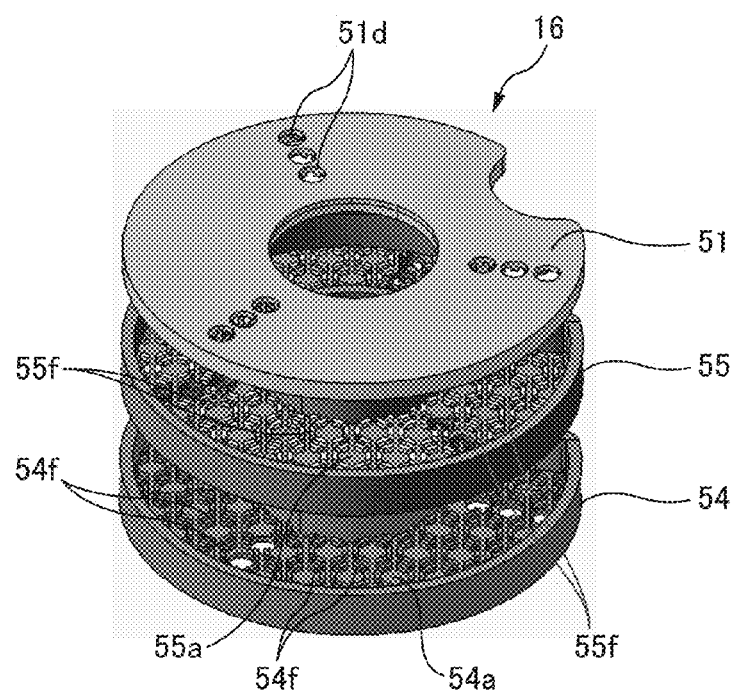
FIG. 29 is a view for describing a modified example where protrusions are provided on the bottom surfaces of the encircling channels.

Moreover, a plurality of protrusions may be provided on the bottom surface of the encircling channel. In the example shown in FIG. 29, a plurality of regular hexagonal protrusions 54f and 55f with missing tops are provided on the surface of the bottom plate 54a and the surface of the intermediate plate 55a. By providing protrusions on the bottom surface of the encircling channel in this manner, condensation of the oil OL is promoted at the time of spraying of the blow-by gas BG. Therefore the performance for separation of the oil OL from the blow-by gas BG can be thereby enhanced. Additionally, the protrusions provided on the encircling channel may take various forms. For example, small concavities and convexities may be formed to produce a rough surface. If a plurality of regular hexagonal protrusions 54f and 55f with missing tops are provided as in the modified example of FIG. 29, high condensation effect can be obtained also for the blow-by gas BG flowing from various directions, without interrupting the flow of the condensed oil OL.

Also, a flow turbulence member for causing turbulence in the blow-by gas BG (the sprayed gas) may be provided in the encircling channel. By causing turbulence in the blow-by gas BG, the retention time in the encircling channel can be made long. Also, the condensation of oil may be promoted by the turbulent blow-by gas BG contacting the flow turbulence member.

Figure 30:
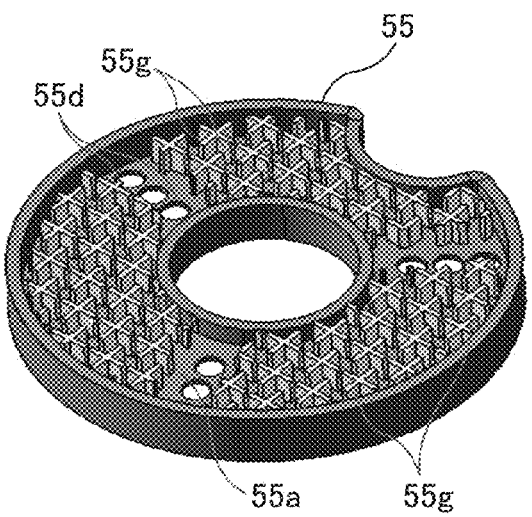
FIG. 30 is a view for describing a modified example where flow turbulence members are provided in the encircling channel.
Figure 31:
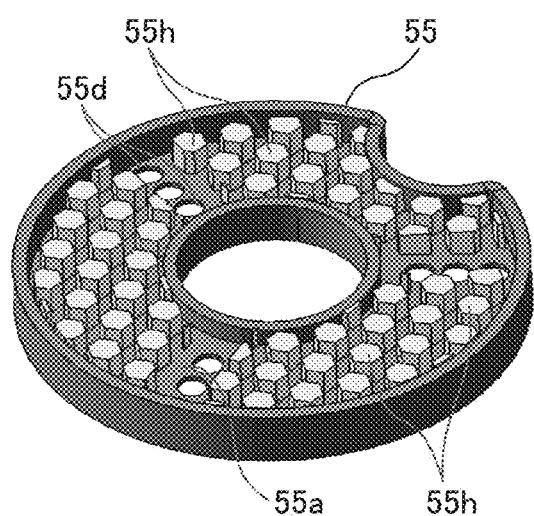
FIG. 31 is a view for describing a modified example where other type of flow turbulence members are provided in the encircling channel.

The flow turbulence member is only for causing turbulence in the blow-by gas BG, and thus, it may take various forms. For example, as in the modified example of FIG. 30, a cross-shaped plate member 55g obtained by combining plate pieces in a cross shape may be used. Alternatively, a hexagonal columnar member 55h may be used as in the modified example of FIG. 31. Additionally, from the standpoint of causing turbulence in the blow-by gas BG, these members 55g and 55h are preferably formed up to the upper end of the encircling channel in the height direction.

Figure 32:
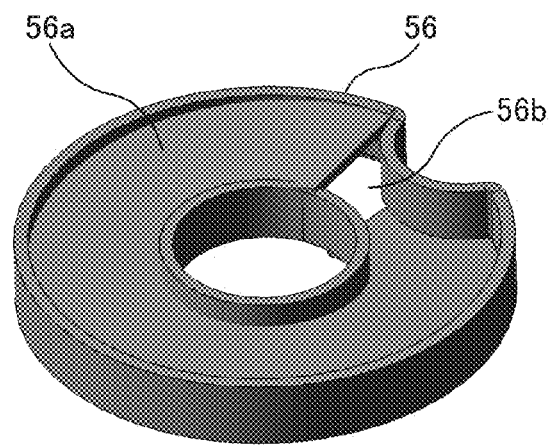
FIG. 32 is a view for describing a modified example where a slope is provided on the bottom surface of the encircling channel.

Furthermore, the bottom surface of the encircling channel may be tilted downward toward the downstream of the blow-by gas BG in the encircling direction. For example, a sloping member 56 shown in FIG. 32 may be used instead of the intermediate member 55 of the modified example of FIG. 25. A bottom surface 56a of the sloping member 56 illustrated in FIG. 32 is tilted downward in an anticlockwise direction, and the blow-by gas BG or condensed oil OL flows toward the downstream side through an opening 56b provided between the upper slope end and the lower slope end.

As described above, the oil OL condensed on the spraying surface flows on the bottom surface of the encircling channel according to the flow of the blow-by gas BG, but by using the sloping member 56 of this modified example, the condensed oil OL moves by the downward slope of the bottom surface 56a and the flow of the blow-by gas BG. As a result, the condensed oil OL is less likely to remain in the encircling channel.

Moreover, the blow-by gas BG has been exemplified as the oil-containing gas, which is the separation target, but the oil-containing gas may be any type of gas as long as it is gas containing oil mist.

Furthermore, the embodiment described above gave an explanation taking the oil separator unit 3 having the core 31 and the separation unit 16 as an example, but the core 31 and the separation unit 16 may be used individually. In this case, the core 31 may be formed of a multi-tube of triple (or more) tube without being restricted to a double tube.

REFERENCE SIGNS LIST

1 Closed crankcase ventilation system
2 Breather pipe
2a Upper breather pipe
2b Downstream side breather pipe
3 Oil separator unit
3b Discharge port
4 Engine
5 Air inlet side channel
6 Air filter
7 Turbocharger
11 Housing
11a Upper end portion of housing
12 Cap member
12a O-ring
13 Filter element
14 Drain member
14a Narrowed portion
14b PCV valve
15 Separation unit holder
16 Separation unit
21 Base
22 Cylindrical communication portion
23 Drain channel
23a Intermediate valve
24 Ceiling
25 Pressing/holding portion
25a Pressing plate
25b Convex protrusion
31 Core
32 Filtering member
33 Inner space of core
34 Internal cylindrical member
35 External cylindrical member
35a Spraying surface
35b Upper engaging hole
35c Lower engaging hole
36 Separation chamber
37 Upper internal cylindrical member
37a Upper end part of upper internal cylindrical member
37b Upper engaging claw
37c Main part of upper internal cylindrical member
38 Lower internal cylindrical member
38a Lower end part of lower internal cylindrical member
38b Lower engaging claw
38c Main part of lower internal cylindrical member
39 Injection hole
40 Circumferential strip protrusion
41 Axial strip protrusion
42 Exhaust hole
43 Circumferential channel
44 Communication space
51 Ceiling member
51a Ceiling plate
51b Inner rib
51c Outer rib
51d Injection hole
52 First intermediate member
52a First intermediate plate
52b Inner rib
52c Outer rib
52d Injection hole
53 Second intermediate member
53a Second intermediate plate
53b Inner rib
53c Outer rib
53d Injection hole
54 Bottom member
54a Bottom plate
54b Inner rib
54c Outer rib
54d Discharge hole
54e Partition plate
54f Protrusion
55 Intermediate member
55a Intermediate plate
55b Inner rib
55c Outer rib
55d Injection hole
55e Partition plate
55f Protrusion
55g Cross-shaped plate member 55h Hexagonal columnar member
BG Blow-by gas
OL Oil
OM Oil mist
CB Carbon
TC1 Top encircling channel (Separation chamber)
TC2 Middle encircling channel (Separation chamber)
TC3 Bottom encircling channel (Separation chamber)

The invention claimed is:

1. A separator that separates oil mist from oil-containing gas containing the oil mist, comprising:
 a separation chamber including an injection hole configured to inject the oil-containing gas while increasing a flow velocity thereof compared with a flow velocity in a gas channel through which the oil-containing gas has flowed, and a spraying surface, facing the injection hole, onto which the oil-containing gas injected from the injection hole is sprayed;
 an oil discharge portion, communicating with the separation chamber, configured to discharge oil condensed on the spraying surface; and
 a gas discharge portion, communicating with the separation chamber, configured to discharge gas after the oil mist that is condensed is separated,
 wherein an encircling channel configured to cause sprayed gas which has been sprayed onto the spraying surface to circulate is formed inside the separation chamber,
 wherein the separation chamber includes
  a ceiling plate partitioning a ceiling surface of the separation chamber, and having the injection hole provided therein,
  a bottom plate partitioning a bottom surface of the separation chamber, and having a discharge hole serving both as the gas discharge portion and as the oil discharge portion provided therein, and
  a lateral plate hermetically joining the ceiling plate and the bottom plate in a stacked state with a space therebetween, and partitioning a lateral surface of the separation chamber, and
 wherein the encircling channel is formed as a flat space, between the ceiling plate and the bottom plate, that is curved along a encircling direction.

2. The separator according to claim 1,
wherein the encircling channel includes
 a first encircling channel configured to cause the sprayed gas to circulate in a first encircling direction, and
 a second encircling channel, communicating with the first encircling channel, configured to cause the sprayed gas to circulate in a second encircling direction opposite the first encircling direction.

3. The separator according to claim 1, wherein
the separation chamber is formed in a double tube having an internal cylindrical member and an external cylindrical member, between an outer circumferential surface of the internal cylindrical member and an inner circumferential surface of the external cylindrical member,
the injection hole is formed in the internal cylindrical member,
the spraying surface is set to a range, on the inner circumferential surface of the external cylindrical member, facing the injection hole,
the gas discharge portion is formed as an opening communicating an inside and an outside of the external cylindrical member, at a position shifted from the spraying surface on the external cylindrical member, and
the oil discharge portion is formed as an opening communicating the inside and the outside of the external cylindrical member.

4. The separator according to claim 3, wherein
the gas discharge portion is formed at a position shifted, from a position where the injection hole is formed, in an axial direction of the double tube, and
a circumferential strip protrusion partitioning a circumferential channel extending in a circumferential direction of the double tube is provided between the injection hole and the gas discharge portion in the separation chamber.

5. The separator according to claim 4, wherein
one end of the double tube in the axial direction is positioned lower than another end, and
an axial strip protrusion that is arranged along the axial direction of the double tube in a protruding manner so as to restrict a flow of the sprayed gas is provided at a position with a space between an end portion of the circumferential strip protrusion.

6. The separator according to claim 3, wherein
the gas discharge portion is arranged being shifted, from a position where the injection hole is formed, in a circumferential direction of the double tube, and
axial strip protrusions for restricting a flow of the sprayed gas are provided along an axial direction of the double tube, proximate the injection hole and proximate the gas discharge portion, respectively, so as to sandwich a space in the separation chamber from the injection hole to the gas discharge portion from outer sides in the circumferential direction of the double tube.

7. The separator according to claim 6, wherein the gas discharge portion is a slit-shaped opening elongated in the axial direction of the double tube.

8. The separator according to any one of claims 3 to 7, wherein a filtering member is arranged on an outer circumferential surface side of the external cylindrical member.

9. The separator according to claim 1, wherein a plurality of the injection holes and a plurality of the discharge holes are formed aligned in a width direction of the encircling channel, intersecting the encircling direction of the sprayed gas.

10. A separator that separates oil mist from oil-containing gas containing the oil mist, comprising:
 a separation chamber including an injection hole configured to inject the oil-containing gas while increasing a flow velocity thereof compared with a flow velocity in a gas channel through which the oil-containing gas has flowed, and a spraying surface, facing the injection hole, onto which the oil-containing gas injected from the injection hole is sprayed;
 an oil discharge portion, communicating with the separation chamber, configured to discharge oil condensed on the spraying surface; and
 a gas discharge portion, communicating with the separation chamber, configured to discharge gas after the oil mist that is condensed is separated,
 wherein an encircling channel configured to cause sprayed gas which has been sprayed onto the spraying surface to circulate is formed inside the separation chamber,
 wherein the separation chamber includes
  a ceiling plate partitioning a ceiling surface of the separation chamber, and having the injection hole provided therein,
  a bottom plate partitioning a bottom surface of the separation chamber, and having a discharge hole serving both as the gas discharge portion and as the oil discharge portion provided therein, an intermediate plate, provided between the ceiling plate and the bottom plate, having another injection hole configured to inject, while increasing a flow velocity, the sprayed gas flowing from an upstream side provided therein, and a lateral plate hermetically joining the ceiling plate, the intermediate plate and the bottom plate in a stacked state with spaces therebetween, and partitioning a lateral surface of the separation chamber, and wherein the encircling channel is formed as a flat space, between the ceiling plate and the intermediate plate and between the intermediate plate and the bottom plate, that is curved with respect to a surface direction of each plate.

11. The separator according to claim 10, wherein a plurality of the injection holes, a plurality of the other injection holes and a plurality of the discharge holes are formed being aligned in a width direction of the encircling channel, intersecting the encircling direction of the sprayed gas.

12. The separator according to claim 1, wherein a plurality of protrusions are provided on a bottom surface of the encircling channel.

13. The separator according to claim 1, wherein a flow turbulence member configured to cause turbulence in the sprayed gas is provided in the encircling channel.

14. The separator according to claim 1, wherein the bottom surface of the encircling channel is tilted downward toward a downstream side in the encircling direction of the sprayed gas.

* * * * *